(12) United States Patent
Matsumoto et al.

(10) Patent No.: US 6,716,522 B2
(45) Date of Patent: Apr. 6, 2004

(54) MOLDED ARTICLE FROM THERMOPLASTIC COMPOSITE MATERIAL AND METHOD FOR PRODUCING THE SAME

(75) Inventors: Koji Matsumoto, Kyoto (JP); Masaki Ito, Kyoto (JP); Koushi Kawabata, Kyoto (JP); Keisuke Hashimoto, Kyoto (JP); Mitsuo Okubo, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 41 days.

(21) Appl. No.: 10/069,065

(22) PCT Filed: Jan. 26, 2001

(86) PCT No.: PCT/JP01/00514
§ 371 (c)(1),
(2), (4) Date: Apr. 4, 2002

(87) PCT Pub. No.: WO01/54884
PCT Pub. Date: Aug. 2, 2001

(65) Prior Publication Data
US 2002/0192401 A1 Dec. 19, 2002

(30) Foreign Application Priority Data

| Jan. 26, 2000 | (JP) | 2000-017245 |
| Sep. 20, 2000 | (JP) | 2000-285169 |
| Oct. 11, 2000 | (JP) | 2000-310903 |
| Nov. 6, 2000 | (JP) | 2000-337892 |
| Nov. 14, 2000 | (JP) | 2000-346982 |

(51) Int. Cl.$^7$ .................. B32B 5/16; B29C 47/04; B29C 47/88
(52) U.S. Cl. .................. 428/326; 264/173.16; 264/211; 264/211.23; 264/237; 428/332; 428/516; 428/523; 428/534; 428/535; 428/537.1
(58) Field of Search .................. 264/173.16, 211, 264/211.23, 237; 428/332, 326, 516, 523, 537.1, 534, 535

(56) References Cited

U.S. PATENT DOCUMENTS

| 5,866,264 A | * | 2/1999 | Zehner et al. | 428/481 |
| 6,579,605 B2 | * | 6/2003 | Zehner | 428/319.9 |

FOREIGN PATENT DOCUMENTS

| EP | 667375 A1 | 8/1995 |
| JP | 53-118467 A | 10/1978 |
| JP | 2-265731 A | 10/1990 |
| JP | 8-118452 A | 5/1996 |
| JP | 8-216122 A | 8/1996 |

* cited by examiner

Primary Examiner—D. S. Nakarani
(74) Attorney, Agent, or Firm—Sughrue Mion, PLLC

(57) ABSTRACT

The present invention has for its object to provide a molded article of a thermoplastic composite material which is not only durable with little discoloration or fading even on prolonged outdoor exposure and is very satisfactory in physical properties and appearance qualities inclusive of wood-like texture but also has high productivity and good economics.

The present invention is a method of producing a molded article of a thermoplastic composite material comprising extruding the thermoplastic composite material containing a thermoplastic resin and a vegetable filler, said vegetable filler content being 50 to 90 weight % of the total weight of said thermoplastic resin and said vegetable filler, wherein extrusion is carried out by means of an extrusion apparatus comprising at least an extruder, a hot shaping die, and a cooling die, said hot shaping die and cooling die being directly coupled.

19 Claims, 14 Drawing Sheets

(a)

(b)

(c)

(a)

(b)

(c)

(a)

(b)

(c)

(a)

(b)

MOLDED ARTICLE FROM THERMOPLASTIC COMPOSITE MATERIAL AND METHOD FOR PRODUCING THE SAME

This is a National Stage entry under 35 U.S.C. §371 of PCT Application No. PCT/JP01/00514 filed Jan. 26, 2001; the noted application is all hereby incorporated by reference.

TECHNICAL FIELD

The present invention relates to a molded article of a thermoplastic composite material and a method of producing the same.

BACKGROUND ART

Many attempts have been made so far to obtain molded articles having a wood-like texture by extrusion of a thermoplastic composite material comprising a mixture of a thermoplastic resin and a vegetable filler such as woodflour.

Japanese Kokai Publication Hei-07-266313 discloses a wood-like synthetic board obtainable by extrusion of a wood-like synthetic powder prepared by blending 20 to 75 weight % of a fragmented cellulosic material and 80 to 25 weight % of a thermoplastic resin molding compound and subjecting the blend to gelation-kneading and granulation.

However, a molded article of a thermoplastic composite material as prepared by increasing the amount of loading with a vegetable filler with over-emphasis placed on a wood-like texture, for example at a high filling rate of about 75 weight % based on the total weight of the thermoplastic composite material, has much to be desired in durability so that it is inadequate for use as an architectural material in the field. When such a molded article is subjected to an outdoor exposure test, discoloration and fading are observed in a short period of time, apparently due to release of the trace colored components occurring in the vegetable filler, such as lignin and hemicellulose.

Japanese Kokai Publication Hei-02-265731 discloses an extrusion method for a thermoplastic composite material containing a thermoplastic resin and a vegetable filler which comprises shaping the thermoplastic composite material in heated and molten state within an extruder equipped with a hot shaping die to a predetermined geometry and sizing the shaped material with a molding die disposed in contact with said hot shaping die and preheated to 80 to 140° C.

However, in such an extrusion method, increasing the speed of extrusion of the thermoplastic composite material leads to an increased warp in the thickness direction of the molded article due to an uneven distribution of temperature. For this reason, there occurs the phenomenon that while the surface of the molded article is cooled and solidified, the core portion remains unsolidified so that only the core portion is extruded. Therefore, the speed of extrusion of the thermoplastic composite material cannot be increased beyond a certain limit, thus leading to low productivity.

Japanese Kokai Publication Hei-08-118452 proposes an extrusion method for a composite material in which a vegetable filler, such as woodflour, is filled into a thermoplastic resin, wherein the extrusion is effected under application of a restrictive force acting against the extrusion force at the metal die outlet to prevent formation of air bubbles and voids. According to this extrusion technology, however, the molding speed cannot be increased so that the productivity necessary for commercial production cannot be attained.

Such thermoplastic composite materials are characterized by the warm feeling inherent in the wood-like component. Attempts have also been made to create wood-like surface by surface cutting. In many of such instances, woodflour is used as the vegetable filler.

However, when woodflour is used as the filler, the molded article may undergo browning due to the decomposition of woodflour by heat to which it is exposed in the kneading with the resin component with the result that large amounts of colored pigments are required for colorizing the article to the desired color; the production apparatus is damaged by the pyrolysate of woodflour formed in the course of kneading; and the weather resistance of the article in outdoor applications is decreased, to mention a few of the consequent disadvantages.

The most striking of these disadvantages is the low weather resistance in outdoor applications. When the weather resistance is low, the inherent brown shade of woodflour is whitened in accordance with aging of weather resistance. The reason is decomposition of the lignin contained in the wood material.

To overcome this disadvantage, a technology inclusive of the method comprising causing titanium oxide particles to be immobilized on the surface of woodflour has been proposed (Japanese Kokai Publication Hei-06-39893). However, such measures are not effective enough to impart sufficient weather resistance.

Meanwhile, the technology using the material available on removal of coloring component, such as lignin, from a wood material, such as peroxide-decolorized woodflour or cellulose powder, as a filler has also been proposed. (Japanese Kokoku Publication Hei-02-33744, Japanese Kokoku Publication Hei-04-64337, Japanese Kokoku Publication Hei-04-7282, Japanese Kokai Publication Hei-10-245461, Japanese Kokai Publication Hei-10-316817, etc.)

These proposed technologies are capable of avoiding the browning of molded articles and the trouble of damage to production apparatus, which are problems caused by usage of woodflour, but since such fillers as cellulose powders are expensive materials as compared with woodflour, the problem of high material cost develops anew.

Japanese Kokoku Publication Hei-04-27924 discloses a molded article obtainable by sanding a molded article composed of a resin and a finely-divided cellulosic aggregate to give scratch marks oriented in one direction and thereby remove the residual internal stress of the surface skin layer and, then, embossing the surface to a wood grain pattern.

Several attempts have also been made to obtain thermoplastic composite materials by blending woodflour with thermoplastic resins such as PE and PP, and what are particularly needed are articles with wood grain motifs. For example, Japanese Kokai Publication Hei-08-207022 discloses an extrusion method of a resin material into a tubular form by means of an extruder using a circular die equipped with a resistance member having a multiplicity of fins or projections protruding inwardly from at least one of the outer peripheral surface side and the inner peripheral surface side, in an intermediate portion along the extrusion direction to impart a wood grain pattern by taking advantage of the extending and orienting effect due to said fins or projections on the colorant materials contained in the thermoplastic composite material.

In the former method among the above, the peripheral surface of the sanding roll to be used is provided with sanding edges arranged in a random pattern but since only the areas contacting the roll are selectively scraped, the difference in surface gloss from the adjacent surface skin layer is objectionably prominent. Moreover, the resulting scratch marks are rather suggestive of "damages" caused by the projecting metallic objects and may constitute a drawback of the molded article in the sense of the consequent risks for invasion of moisture in long-term use. Thus, because the above scratch mark is intended to remove the residual internal stress of the surface skin layer, the central zone of the mark forms a deep groove which is susceptible to moisture invasion and pooling.

In the latter method, the resin material once diverted by the resistance member having fins or projections joins again and becomes fused in the resin passage within the die but the zone of this fusion forms the so-called weldline which is inferior to the remaining part in mechanical properties. Furthermore, because of the existence of said weldline in the same layer of the same kind, a structure liable to undergo crack-propagative destruction tends to develop. Moreover, as the pattern imparted by said resistance member is subjected to heat in the downstream resin passage within the metal die, the colorant particles are dispersed to reduce the contrast, although the weldline is not abolished, thus making pattern control difficult. In addition, because said resistance member is disposed internally of the metal die, much labor is required for changing it to a different resistance member for imparting a different pattern.

SUMMARY OF THE INVENTION

In view of the above state of the art, the present invention has for its object to provide a molded article of a thermoplastic composite material which is not only durable with little discoloration or fading even on prolonged outdoor exposure and is very satisfactory in physical properties and appearance qualities inclusive of wood-like texture but also has high productivity and good economics.

The present invention, therefore, relates to a method of producing a molded article of a thermoplastic composite material comprising
  extruding the thermoplastic composite material containing a thermoplastic resin and a vegetable filler,
  the vegetable filler content being 50 to 90 weight % of the total weight of the thermoplastic resin and vegetable filler,
  wherein extrusion is carried out by means of an extrusion apparatus comprising at least an extruder, a hot shaping die, and a cooling die,
  the hot shaping die and cooling die being directly coupled.

In the method of producing a molded article of a thermoplastic composite material according to the invention, it is preferable that a coating layer composed of a resin material containing a thermoplastic resin is formed on the surface of a core layer obtainable by extrusion of the thermoplastic composite material.

The extrusion apparatus to be used in the method of producing a molded article of a thermoplastic composite material according to the invention preferably comprises the extruder, the hot shaping die, the cooling die, a surface heating die, and a hot coating die as serially arranged in this order, the hot shaping die and cooling die and the surface heating die and hot coating die being directly coupled respectively and, more preferably, the cooling die and surface heating die being also directly coupled.

It is preferable that primary cooling at 150 to 180° C. is followed by secondary cooling at 60 to 140° C. in said cooling die.

Preferably said extruder is a counterrotating twin-screw extruder and the temperature of the thermoplastic composite material at the outlet of the counterrotating twin-screw extruder is controlled within the range of (melting point −15° C.) to (melting point +10° C.) of the thermoplastic resin contained in the thermoplastic composite material.

Preferably said hot coating die has a shaping passage for the resin material and a supply passage for supplying said resin material to said shaping passage, said supply passage and said shaping passage intersecting each other, and said supply passage being internally provided with a projection protruding in the thickness direction of the passage.

Preferably said supply passage is internally provided with a groove.

A molded article of a thermoplastic composite material obtainable by said method of producing a molded article of a thermoplastic composite material constitutes a further aspect of the present invention.

Referring to said molded article of a thermoplastic composite material, said resin material preferably comprises at least two kinds of thermoplastic resins differing in melting point and being incompatible with each other.

Preferably the thermoplastic resin contained in said thermoplastic composite material is a polyolefin resin.

Preferably said coating layer is 0.1 to 0.5 mm in thickness.

Preferably said molded article of a thermoplastic composite material is a molded article having a profile.

Preferably the thermoplastic resin contained in said thermoplastic composite material is identical to the thermoplastic resin contained in said resin material.

A molded article of a thermoplastic composite material obtainable by said method of producing a molded article of a thermoplastic composite material wherein the resin material preferably contains a cellulose powder.

Preferably said cellulose powder content is 20 to 60 weight % of the resin material.

Preferably said coating layer is 0.1 to 3 mm in thickness.

BRIEF DESCRIPTION OF THE DRAWINGS

In FIGS. 1 to 5, the reference numeral 1 represents an extruder, 2 represents a hot shaping die, 3 represents a cold shaping die, 4 represents a surface heating die, 5 represents an extruder, 6 represents a hot coating die, 7 represents an extrusion apparatus, 8 represents a molded article of a thermoplastic composite material, 10 represents a supply passage, 11 represents a cooling tank, and 12 represents a take-off device.

In FIGS. 6 to 12, the reference numeral 13 represents an extrusion apparatus, 14 represents an extruder, 15 represents a shaping die, 16 represents a primary cooling die, 17 represents a flow-through pipe, 18 represents a secondary cooling die, 19 represents a flow-through pipe, 20 represents a molded article, 21 represents an extrusion apparatus, 22 represents an extruder, 23 represents a primary cooling die, 24 represents an electric heater, and 25 represents a molded article.

In FIGS. 13 to 14, the reference numeral 26 represents a counterrotating twin-screw extruder, 27 represents a hot shaping die, 28 represents a cooling die, 29 represents an adapter, 30 represents a primary cooling die, 31 represents a secondary cooling die, 32 represents a hot shaping die, 33 represents a cooling die, 34 represents a water tank, and 35 represents a take-off device.

In FIGS. 15 to 25, the reference numeral 36 represents a molded article of a thermoplastic composite material, 37 represents a core layer, 38 represents a coating layer, 39 represents an extrusion apparatus, 40 represents a first extruder, 41 represents a hot shaping die, 42 represents a cooling die, 43 represents a surface heating die, 44 represents a second extruder, 45 represents a hot coating die, 46 represents an abrasive device, 47 represents a main starting material inlet, 48 represents an auxiliary starting material inlet, 49 represents a shaping passage, 50 represents a supply passage, 51 represents a substrate passage opening, 52 represents a projection, 53 represents an annular groove, 54 represents a branch manifold, and 55 represents a connecting groove.

DISCLOSURE OF INVENTION

Figure 1:
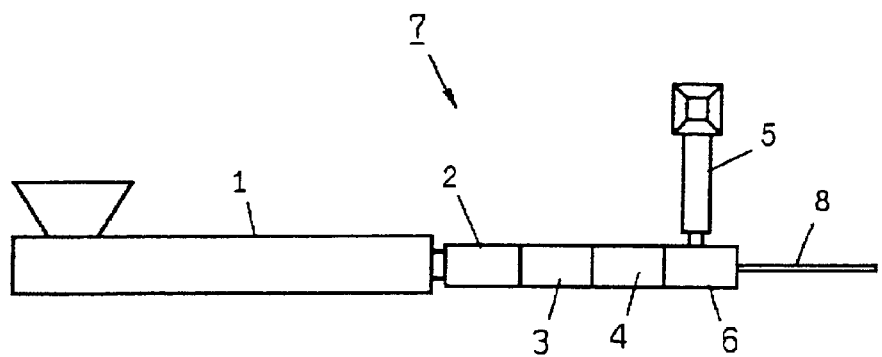
FIG. 1 is a schematic side-elevation view showing an example of a preferred extrusion apparatus for use in the practice of the present invention.

The present invention is now described in detail.

The method for producing a molded article of a thermoplastic composite material according to the present invention is a method comprising extruding the thermoplastic composite material containing a thermoplastic resin and a vegetable filler, the filler content being 50 to 90 weight % of the total weight of the thermoplastic resin and vegetable filler.

The thermoplastic resin contained in said thermoplastic composite material is not particularly restricted but includes, for example, polyolefin resins such as polyethylene, polypropylene, polybutene, poly(4-methyl-1-pentene), poly (ethylene-co-vinyl acetate), etc.; polyamide resins, polyacetal, poly(ethylene terephthalate), poly(butylene terephthalate), fluororesins, poly(phenylene sulfide), polystyrene, acrylonitrile-butadiene-styrene resin (ABS resin); acrylic resins such as poly(meth)acrylic acid, poly (meth)acrylates, etc.; polycarbonate, polyurethane resins; vinyl resins such as poly(vinyl chloride), poly(vinyl acetate), polyacrylonitrile, poly(vinyl alcohol), etc.; polyvinylidene resins such as poly(vinylidene chloride); poly(phenylene oxide), poly(ethylene-co-vinyl acetate), polyester resins, polyether resins, and polyurea resins. Where necessary, recycled materials such as plastic products, flashes trimmed off in molding processes, and initial loss materials rejected before the production run reaches a steady state can also be used. Among these, in consideration of physical properties such as moldability and chemical resistance, cost and other factors, polyolefin resins such as polyethylene and polypropylene are used with advantage. These resins may be used each independently or in a combination of two or more species.

The vegetable filler mentioned above is not particularly restricted only provided that the obtainable molded article will have a wood-like appearance and a soft tactile texture and that it is of the vegetable origin. Thus, for example, woodflour inclusive of cuttings, grindings, sawdust, pulverizates of timbers, wooden boards, plywood, pulp, bamboo canes, etc.; and shells of cereal crops and fruits such as hulls and nutshells and crushed matter thereof can be mentioned. Moreover, where necessary, vegetable fillers may be surface-treated with a silane coupling agent or a titanium coupling agent, etc.

Generally, the above vegetable fillers can be used if their particle diameters are within the range of 1 to 1000 μm. If the particle diameter is less than 1 μm, a uniform dispersion can hardly be attained and, moreover, the viscosity build-up of the material within the extruder tends to detract from extrusion-moldability. If it exceeds 1000 μm, the vegetable-filler grain will be too prominent to insure a wood-like appearance and also tends to detract from the surface quality of the molded article. The preferred diameter is 10 to 300 μm, more preferably 5 to 300 μm.

The content of the vegetable filler in said thermoplastic composite material is 50 to 90 weight % of the total weight of the thermoplastic resin and vegetable filler. If it is less than 50 weight %, the wood-like texture of the molded article of the thermoplastic composite material to be obtained will be deteriorated. If it exceeds 90 weight %, the dispersibility in the thermoplastic resin will start deteriorating so that the physical properties tend to be adversely affected. Within the range of 50 to 90 weight % where the proportion of the thermoplastic resin is reasonably low and the proportion of the vegetable filler (solid) is sufficiently high, the cooling efficiency in the cooling die is high and the calories deprived of in molding is small so that the molding speed is increased. The preferred range is 55 to 80 weight %.

Since said vegetable filler generally contains about 5 to 10 weight % of water, it is preferably dried in an oven or the like in advance or the water is preferably removed, in the form of water vapor, from the deaerating vent during extrusion. If the water content of the above vegetable filler is high, air bubbles originating from the water vapor may form in the molded article to adversely affect physical properties or result in a poor appearance.

The above thermoplastic resin and vegetable filler are evenly blended to give a thermoplastic composite material.

The above thermoplastic composite material may further contain other fillers.

The other fillers mentioned above are not particularly restricted. Thus, for example, there may be mentioned aluminum hydroxide, ettringite, silica sand, borax, alumina, talc, kaolin, calcium carbonate, silica, magnesium hydroxide, mica, flyash, calcium silicate, mica flakes, molybdenum dioxide, steatite, glass fiber, glass beads, titanium oxide, asbestos, magnesium oxide, barium sulfate, clay, dolomite, calcium aluminate hydrate, and metal powders such as iron powders.

In the method of producing a molded article of a thermoplastic composite material according to the present invention, it is preferable that a coating layer composed of a resin material containing the thermoplastic resin is formed on the surface of a core layer obtainable by extrusion of the thermoplastic composite material. In this embodiment, notwithstanding the fact that the core layer contains a vegetable filler at a high filing rate of 50 to 90 weight %, the existence of a coating layer containing the thermoplastic resin on its surface blocks the release of trace colored components occurring in the vegetable filler, so that no fading or discoloration takes place even on long-term outdoor exposure.

The thermoplastic resin contained in said resin material is not particularly restricted provided that it has the property to inhibit the aging of weather resistance due to outdoor exposure. As such thermoplastic resins, those mentioned for use in said thermoplastic composite material can be employed. The preferred, among them, are acrylic resins, such as poly(methylene methacrylate) etc., and saturated polyester resins.

The use of the same kind of thermoplastic resin for said thermoplastic composite material and the resin material is preferred from the standpoint of the ease of recycling of the molded article of the thermoplastic composite material. Furthermore, when a polyolefin resin is used for the thermoplastic composite material, it is preferable that a polyolefin resin be used for the resin material as well from the standpoint of adhesion between the core layer and the coating layer because the polarity of polyolefin resins is low.

It is preferable that said resin material contains at least two kinds of thermoplastic resins differing in melting point and being incompatible with each other. When a resin material obtainable by mixing two kinds of thermoplastic resins differing in melting point and incompatible with each other (the lower-melting one will hereinafter be referred to as "resin A" and the higher-melting one as "resin B") is molded at a temperature compatible with the melting point of resin A, resin B is not dispersed in completely molten state but forms grains in resin A and this incompatible state of resin A and resin B gives rise to mottled shades, thus creating a wood grain pattern.

The above resin A is preferably a resin having high viscosity and a melting point of 130 to 300° C., and it is more preferable that the difference in melting point from resin B is 10 to 120° C.

The resin material mentioned above preferably contains a cellulose powder.

The cellulose powder mentioned above means any of the powders obtainable by subjecting a woodflour, paper or pulp to chemical treatment with an acid, an alkali, or the like to remove lignin and other impurities for increased whiteness, and as an example, there can be mentioned KC Floc (tradename) manufactured by Nippon Paper Industries.

By forming a coating layer of the resin material containing a cellulose powder, both a good wood-like texture and a high degree of weather resistance can be realized. Moreover, since the cellulose powder exists only in the coating layer, the amount of cellulose powder to be used need not be so large that a molded article of a thermoplastic composite material having excellent weather resistance can be obtained at a comparatively low cost.

The above cellulose powder content is preferably 20 to 60 weight % of the total resin material. If it is less than 20 weight %, an acceptable wood-like texture may not be obtained. If it exceeds 60 weight %, the cellulose powder will hardly be dispersed. Moreover, the high content of expensive cellulose powder will result in an economic disadvantage.

When said resin material contains a cellulose powder, the resulting coating layer of the molded article of the thermoplastic composite material may be subjected to surface treatment. For example, sanding causes the cellulose powders to be exposed on the surface so that the wood-like texture is further accentuated.

Furthermore, where necessary the molded article of the thermoplastic composite material according to the invention may have other additives formulated in one of the core layer and the coating layer or in both layers.

The additives mentioned above are not particularly restricted but include filler dispersants, lubricants, non-vegetable fillers, pigments, aging inhibitors such as light stabilizers, antioxidants, etc., foaming agents, plasticizers, flame retardants, and acid-modified olefins, for instance.

As said filler dispersants and lubricants, there can be mentioned, for example, fatty acid compounds such as stearic acid; fatty acid amide compounds such as stearamide, palmitamide, methylene-bis-stearamide, etc.; ester compounds such as butyl stearate, hydrogenated castor oil, ethylene glycol monostearate, etc.; alcohol compounds such as cetyl alcohol, stearyl alcohol, etc.; hydrocarbon compounds such as liquid paraffin, native paraffin, microwax, polyethylene wax, etc.; metal soap compounds such as zinc stearate, calcium stearate, lead stearate, etc.; and modified polymers such as maleic anhydride-modified polymers.

As the non-vegetable fillers mentioned above, there can be mentioned reinforcing materials such as glass fiber, carbon fiber, etc., marble powder, and metal powders, for instance.

As said pigments, there can be mentioned inorganic pigments such as titanium oxide, red iron oxide, chromium oxide, iron black, titanium yellow, zinc-iron brown, titanium-cobalt green, cobalt green, cobalt blue, copper-chromium black, copper-iron black, yellow lead, molybdate orange, ultramarine, carbon black, etc.; and organic pigments such as azo pigments, phtalocyanine pigments, and condensed polycyclic pigments, for instance.

As said light stabilizers, there can be mentioned, for example, UV absorbers such as benzotriazole UV absorbers, benzophenone UV absorbers, salicylate UV absorbers, cyanoacrylate UV absorbers, etc.; radical scavengers such as hindered amine radical scavengers; and delusterants such as nickel complexes. Formulating such additives as UV absorbers, UV aging inhibitors, and/or oxidative aging inhibitors exclusively in said coating layer may be expected to bring about improvements in both performance and cost.

As said antioxidants, there can be mentioned phenolic antioxidants, amine antioxidants, sulfur series antioxidants, phosphorus series antioxidants, and so on. Formulating these aging inhibitors leads to further improvements in the weather resistance of the molded article of the thermoplastic composite material to be obtained.

As said foaming agents, there can be mentioned inorganic foaming agents such as ammonium carbonate, sodium hydrogen carbonate, etc.; and organic foaming agents such as dinitrosopentamethylenetetramine, N,N'-dimethyl-N,N'-dinitrosoterephthalamide, benzenesulfonylhydrazide, p-toluenesulfonylhydrazide, P,P'-oxybis (benzenesulfonylhydrazide), 3,3'-disulfonehydrazide phenyl sulfone, azobisisobutyronitrile, azodicarbonamide, barium azodicarboxylate, and diethyl azodicarboxylate, for example. As such a foaming agent is added to the resin material, the resin material undergoes foaming during or after molding, thus contributing to an enhanced wood-like texture of the molded article of the thermoplastic composite material. Where necessary, an auxiliary foaming agent may further be added.

As said plasticizers, there may be mentioned α,β-unsaturated carboxylic acid monomers and low molecular weight olefins, for instance.

When a sufficient fusion can hardly be obtained between the thermoplastic resin contained in said thermoplastic composite material and the thermoplastic resin contained in said resin material, an intermediate layer may further be provided.

For example, when polypropylene is used for the core layer and poly(methylene methacrylate) is used for the coating layer, the affinity between them is so low that a coating layer is not easy to be formed. However, by providing an intermediate layer comprising an acid-modified polypropylene or the like which has a high affinity for both resins, a molded article of a thermoplastic composite material featuring an intimate bond between the core layer and the coating layer can be obtained.

The thickness of said coating layer is not particularly restricted but is preferably within the range of 0.1 to 0.5 mm. If it exceeds 0.5 mm, the plastics appearance of the surface is increased and the wood-like texture is decreased. If it is less than 0.1 mm, it will be difficult to produce the molded article of the thermoplastic composite material. Within the above-mentioned range, the thickness of the coating layer is preferably as thin as possible and more preferably 0.1 to 0.3 mm.

In the case where said resin material contains a cellulose powder, the thickness of the coating layer is preferably 0.1 to 3 mm. If it is less than 0.1 mm, a coating layer may hardly be obtained with good reproducibility in terms of molding hence it becomes difficult to maintain high weather resistance in some area of the layer. If it exceeds 3 mm, a large amount of the expensive cellulose powder will be required, thus causing an economic disadvantage.

The method of producing a molded article of a thermoplastic composite material according to the present invention comprising extruding the above thermoplastic composite material by means of an extrusion apparatus comprising at least an extruder, a hot shaping die and a cooling die, the hot shaping die and cooling die being directly coupled. Preferably the extrusion apparatus is so constituted that the extruder, the hot shaping die, the cooling die, a surface heating die, and a hot coating die are serially arranged in this order, with the hot shaping die and cooling die and the surface heating die and hot coating die being directly coupled respectively. It is more preferable that the cooling die and surface heating die are also directly coupled.

As used in this specification, the term "directly coupled" means that the relevant component members are directly interconnected without an interval. On the other hand, the term "connected" means that the members are anyhow connected with each other, regardless of the mode of connection, and there may exist an adaptor or the like third member therebetween.

In the conventional extrusion method of an ordinary thermoplastic resin, usually the hot shaping die and cold shaping die connected to the extruder are separated from each other and the cold shaping is effected under a tension applied by a take-off device. In this case, however, the thermoplastic resin on emergence from the hot shaping die is immediately released from the restraint of the metal die so that molding conditions must be delicately controlled and the complicated profile can hardly be maintained. Particularly in the case of a thermoplastic composite material loaded with a vegetable filler at a high filling rate, the viscosity of the material itself becomes so low that the above tendency is more pronounced. Thus, by the conventional technology, even obtaining a molded article can hardly be expected.

In the present invention, wherein an extrusion apparatus having a hot shaping die and a cooling die directly coupled is used, solidification and extrusion can be effected, that is to say the material can be cooled to solidify while it remains under the back pressure of extrusion, so that the density of the extruded article is increased to favor the physical properties. Moreover, even in the case of a thermoplastic composite material with little viscosity, the metal die geometry reproducibility is so high that a thermoplastic resin can be supplied over a core layer loaded with a vegetable filler at a high filling rate to form a uniform, thin coating layer, which has heretofore been hardly accomplished. Particularly incases where to obtain a molded article of a thermoplastic composite material having a special profile which is random in sectional configuration, although it has been considered difficult to coat a thermoplastic resin uniformly onto a core layer loaded with a vegetable filler at a high filling rate, it is succeeded in doing so by directly coupling each of the above metal dies.

The extruder mentioned above is not particularly restricted but includes, for example, a single-screw extruder, a corotating twin-screw extruder, a counterrotating twin-screw extruder, a planetary screw extruder, a KCK Contenian mixer, and so forth.

The method of supplying said thermoplastic composite material to said extrusion apparatus includes the following methods, for instance.

1. The method in which the thermoplastic composite material is directly supplied to an extruder for kneading under heating with a heater-kneader means and direct molding.
2. The method in which the thermoplastic composite material is kneaded under heating with an extruder to prepare pellets and thus-obtained pellets are supplied to said extrusion apparatus for extrusion.
3. The method in which the thermoplastic composite material is kneaded under heating with a batch equipment, such as Super-Mixer, in advance to prepare pellets and thus-obtained pellets are supplied to said extrusion apparatus for extrusion.

When the above method 1 is employed, an extruder having a large kneading effect, such as a twin-screw kneading extruder, is used with advantage. In the above methods 2 and 3 where the formulation is pelletized in advance, an extruder insuring a fairly large extrusion capacity, such as a single-screw extruder or a twin-screw extruder, is used with advantage. In both cases, it is preferable to employ a twin-screw or multi-screw extruder for improved kneading effect. It is more preferable to use an extruder equipped with a main starting material inlet on the upstream side (the side of the base of the screw) and an auxiliary starting material supply port (device), such as a side feeder, on the downstream side of the extruder. With such equipment, the amount of loading with a filler can be accurately controlled to improve the material characteristics of the molded article of the thermoplastic composite material to be obtained.

In the present invention, for enhanced productivity, the temperature of the thermoplastic composite material at the extruder outlet is preferably set within the range of the (melting point −15° C.) to (melting point +10° C.) of the thermoplastic resin contained in the thermoplastic composite material. If this temperature is below the (melting point −15° C.), the thermoplastic resin does not melt, regardless of which of various extruders is used, so that the physical properties of the resulting molded article of the thermoplastic composite material are adversely affected. On the other hand, if the temperature exceeds the (melting point +10° C.), extrusion will still be possible but because of the temperature increase of the thermoplastic composite material, the cooling efficiency in the cooling die is decreased so that the molding speed cannot be increased.

By carrying out extrusion at a low temperature, with the temperature of the thermoplastic composite material at the extruder outlet being controlled within the range of the (melting point −15° C.) to (melting point +10° C.) of the thermoplastic resin, the cooling efficiency in the cooling die is enhanced and, hence, the molding speed is increased. The more preferred temperature range is (melting point −10° C.) to (melting point +5° C.).

When the temperature of the thermoplastic composite material at the extruder outlet is controlled within the range of the (melting point −15° C.) to (melting point +10° C.) of the thermoplastic resin contained in the thermoplastic composite material, it is necessary to use a counterrotating twin-screw extruder as the extruder.

The range of (melting point −15° C.) to (melting point +10° C.) of the thermoplastic resin is an unusually low temperature as the conventional extrusion and extrusion cannot be carried out with an extruder such as a single-screw extruder or a corotating twin-screw extruder. Thus, in the case of an extruder of the type generating a forward propulsive force by melting the resin, such as a single-screw extruder or a corotating twin-screw extruder, the temperature range of (melting point −15° C.) to (melting point +10° C.) of the thermoplastic resin is extremely low so that the resin cannot be sufficiently melted and, hence, can hardly carry out the extrusion.

In contrast, a counterrotating twin-screw extruder produces a forward propulsive force due to its structural function and, is capable to carry out extrusion even if the thermoplastic resin is not sufficiently melted so that it can be used for extrusion within the temperature range of (melting point −15° C.) to (melting point +10° C.).

The temperature of said cooling die is preferably controlled at a level between the temperature lower by at least 10° C. than the temperature of the thermoplastic composite material passing through it and the solidification temperature of the thermoplastic composite material.

In said cooling die, it is preferable that primary cooling at 150 to 180° C. is followed by secondary cooling at 60 to 140° C.

If the primary cooling temperature is lower than 150° C., a large temperature variation will take place in the thickness direction of the molded article, with only the surface of the molded article of thermoplastic composite material being cooled and the core portion remaining unsolidified so that the speed of extrusion of the thermoplastic composite material may hardly be increased. On the other hand, if it exceeds 180° C., the cooling effect will be decreased so that it becomes difficult to solidify.

If the secondary cooling temperature is lower than 60° C., the surface of the molded article of the thermoplastic composite material will tend to develop wrinkles which detract from surface characteristics. On the other hand, if it exceeds 140° C., the cooling will be insufficient and the dimensional accuracy of the molded article will be decreased, with the result that the speed of extrusion of the thermoplastic composite material may not be increased.

Referring to said cooling die, a method comprising two kinds of cooling dies, namely a primary cooling die and a secondary cooling die, can be used to effect cooling in two stages inclusive of primary cooling and secondary cooling.

As a first means for controlling the temperatures of the above primary cooling die and secondary cooling die, there can be mentioned a method which comprises providing a thermocouple and an electric heater for each of the primary cooling die and secondary cooling die so that the internal temperatures of the primary cooling die and secondary cooling die may each be electrically controlled by their respective thermocouples and electric heaters.

In the above method involving electrical temperature control, the powder supply for each electric heater is automatically switched ON and OFF so as to attain a predetermined temperature by a temperature controller according to the electric signal from the thermocouple. The electric heater is advantageously used for controlling temperatures within the range of 150 to 180° C. Since a temperature lower than 150° C. can hardly be controlled with an electric heater, the method involving electrical temperature control is suited to the temperature control of the primary cooling die.

As a second means for controlling the temperatures of said primary cooling die and secondary cooling die, there can be mentioned a method such that each of the primary cooling die and secondary cooling die is formed with a flow-through means and a heat medium controlled to a predetermined temperature by an external temperature regulator is supplied to this flow-through means to control each of the internal temperatures of the primary cooling die and secondary cooling die.

The heat medium mentioned above includes constant-temperature water and constant-temperature oil, for instance. Thus, by supplying constant-temperature water or constant-temperature oil controlled at a predetermined temperature to the flow-through means provided in the cooling die, the cooling die can be controlled at a suitable temperature. The flow-through means mentioned above is preferably disposed as uniformly as possible with respect to the sectional configuration of the molded article of the thermoplastic composite material. When such flow-through means is disposed symmetrically in the upper and lower faces and in the left and right faces of the cooling die, the temperature distribution within the cooling die can be made more uniform. Constant-temperature water is used with advantage for temperature control within the range of 60 to 120° C. Since constant-temperature water is hardly capable of controlling temperatures beyond 120° C., constant-temperature water is suited for temperature control of the secondary cooling die. In contrast, constant-temperature oil is used with advantage for temperature control within the range of 60 to 180° C. Therefore, constant-temperature oil is suited for temperature control of both the primary cooling die and the secondary cooling die.

The hot coating die mentioned above usually has a length (lip) of about 3 to 100 mm in the direction of extrusion. If it is less than 3 mm, it will be difficult to attain a uniform coating of the whole surface of the extruded article obtainable from the hot shaping die, and this tendency is particularly pronounced when the extruded article has a complicated profile. On the other hand, if the length exceeds 100 mm, the intra-die back pressure at the forward end will rise to reduce the extrusion capacity. Though it depends on the geometry of the molded article, extrusion is easy when the length is about 3 to 100 mm.

The hot coating die mentioned above is designed to be larger than the hot shaping die by the equivalent of the thickness of the coating layer which is to be formed on the entire surface, or on a necessary area of the surface, of the extruded article obtainable from the hot shaping die.

The sectional configuration of the internal surface of said hot coating die is constant in the direction of extrusion.

When, for example, the coating layer is composed of a plurality of incompatible thermoplastic resins so as to fabricate a molded article of a thermoplastic composite material having a variable wood grain pattern in the present invention, it is preferable that the above hot coating die has a shaping passage for the resin material and a supply passage for supplying the resin material to the shaping passage, with the supply passage and the shaping passage intersecting each other and the supply passage being internally provided with a projection protruding in the thickness direction of the passage.

By internally providing the above supply passage with the projection protruding in the thickness direction thereof, the resin flow within the hot coating die can be controlled and, therefore, the molded article of the thermoplastic composite material having a variable of wood grain pattern as well as good durability can be produced without detracting from the strength.

The height of said projection is preferably 5 to 50% of the thickness of the passage. If it is within 5 to 50%, there is no complete blockade of thermoplastic resin flow.

The shape of said projection is not particularly restricted but may for example be round, quadrangular, or polygonal.

The material of which said projection is made is not particularly restricted but may for example be a metal. Preferred is the steel in use for the manufacture of metal dies, among others. The above projection may have a plating layer.

The projection may be present singly or in a plurality of numbers. When the number is plural, the projections may be disposed in a constant interval or in a non-geometrical random pattern.

Figure 23:
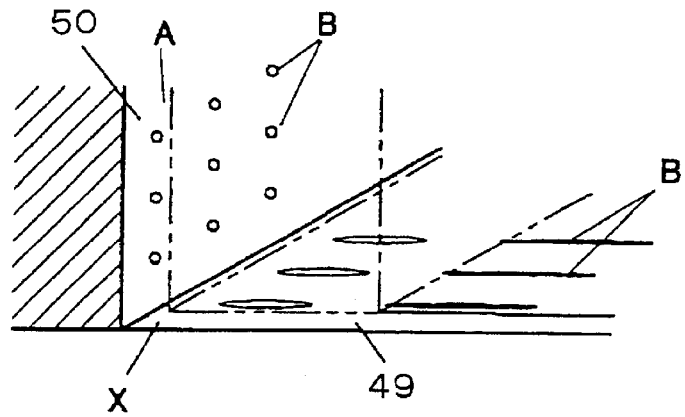
FIG. 23 is an action diagram illustrating the principle of action according to which the resin B is stretched within the coating metal die of the invention.

An embodiment of the above hot covering die having a supply passage internally provided with projections protruding in the thickness direction of the passage is illustrated in FIG. 23, for example. This die has a shaping passage 49 (outlet passage) for shaping to the geometry of the final molded article and a slit-like material supply passage 50 connected to the upstream end of said shaping passage 49 and disposed in perpendicular relation thereto. In this case, the portion at which the resin B is stretched as mentioned hereinbefore is in the shaping passage which is a clearance formed between the core layer which is a virtually rigid body and the hot coating die and extending from immediately upstream of the position X of confluence with the core layer (namely, the point of intersection of the supply passage with the shaping passage). Thus, by controlling the resin material flow in the supply passage, the resin B is dispersed in the resin A to a desired state and the resin material is caused to pass through the shaping passage, whereby the resin B in molten or semi-molten state is stretched forcefully in the direction of extrusion by the shear force acting between the core layer and the hot coating die and, hence, a variety of wood grain patterns can be formed by control of the above resin flow.

It is more preferable that said supply passage is internally provided with a groove. In the case where said supply passage is internally provided with the groove, a mottled color pattern is created by said plurality of incompatible thermoplastic resins as the thermoplastic resins in molten state pass through the grooves.

When said groove is formed in an annular pattern, the mottled color pattern converges, for instance, to produce a more variegated color design and as the resin is extruded in the manner of a waterfall onto the surface of the core layer, there is obtained a wood grain pattern more true to natural wood.

Figure 24:
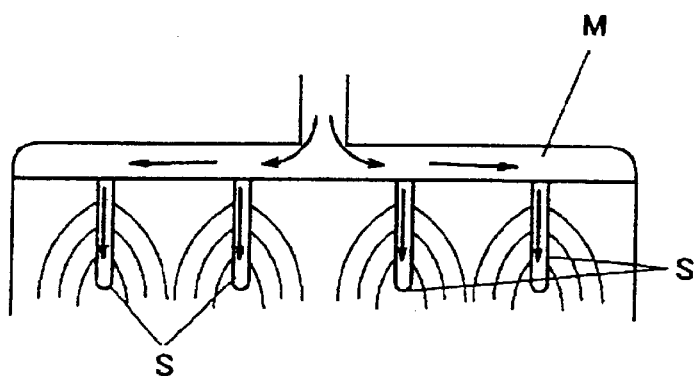
FIG. 24 is an action diagram illustrating the resin flow in the case where the coating metal die of the invention is provided with grooves in vertical directions.
Figure 25:
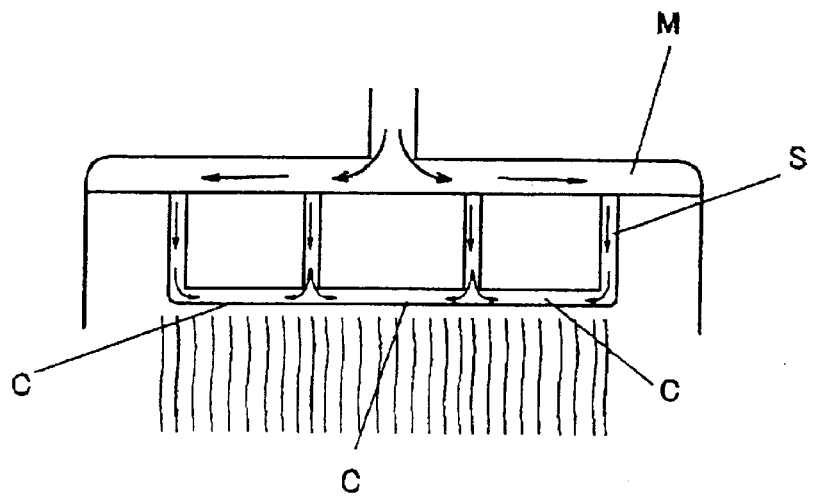
FIG. 25 is an action diagram illustrating the resin flow in the case where the coating metal die of the invention is provided with grooves in vertical directions and a connecting groove.

The sectional configuration of the above groove is not particularly restricted but may for example be semi-circular, generally semi-circular, rectangular, or V-shaped. From processability points of view, the semi-circular or generally semi-circular configuration is preferred. The arrangement of said groove is not particularly restricted but may for example be the arrangement illustrated in FIG. 24. Thus, a main manifold M (for example, an annular groove provided around the substrate) which provides for a main current, and a plurality of branch manifolds S (grooves provided in vertical direction) disposed in vertical directions to the main manifold, which provide affluent streams are provided in the hot coating die. In this arrangement, the resin flow of the resin material issuing out of each branch manifold S and entering the slit-like supply passage spreads generally in the manner of contour lines as illustrated in FIG. 24 so that a cross-grain wood pattern can be obtained. Furthermore, there may also be provided a connecting groove C connecting the forward ends of the plurality of branch manifolds S as illustrated in FIG. 25. In this arrangement, the resin material flows in a substantially uniform distribution from the connecting groove C onto the whole of the board in the breadth direction, so that a generally regular-grain wood pattern can be obtained.

After formation of the coating layer composed of a resin material comprising said resins A and B, the surface of the resulting molded article of the thermoplastic composite material can be grinded for imparting a wood grain pattern with a continuously revolving abrasive device. In this operation, the surface of the molded article of the thermoplastic composite material coming into contact with the revolving abrasive device generates a heat of friction at the contact portion to cause a local elevation of temperature. In the case where this temperature is not lower than the melting point of resin B, both resins A and B are at molten state and, on the surface of the revolving abrasive device, the resin B is stretched linearly in the grinding direction so that a visually wood grain pattern is produced. Moreover, in the case where the temperature elevated by said heat of friction is slightly lower than the melting point of resin B, the resin B becomes half-melted state and stretched linearly in the grinding direction on the surface of the revolving abrasive device to form a visually wood grain pattern. Moreover, by applying scratch marks generally in one and the same direction with the abrasive device insuring that the damages to the coating layer surface will be as uniform as possible in coincidence with the formation of the visual wood grain pattern, there can be obtained a surface simulating a wood grain also in tactile texture.

The abrasive device mentioned above is not particularly restricted but may for example be a sanding roll, an endless belt, a brush-like element or a comb-like element, which is driven into revolution. The surface material of the abrasive device includes materials capable of creating shallow scratch marks on the surface of a molded article, such as sandpaper, nylon fiber-grind stone particles, resins and metals, etc.

In conducting the above continuous surface modification with said abrasive device, the modification is preferably performed while water is directly applied to the point of abrasion (the point of modification) in order that the stretched resin B may be quickly solidified and also in order to flush off the shavings formed in modification.

The internal surfaces of the respective metal dies used in the above extrusion equipment are preferably flat and smooth and more preferably have been plated, Teflon-coated, or otherwise processed. From cost and other points of view, chromium plating is a preferred plating treatment.

The sectional configurations of said cooling die and surface heating die are preferably the same as the sectional configuration of the outlet of the hot shaping die. If it is not the same configuration, the back pressure in the metal die will increase so that it will be difficult to sufficiently increase the extrusion capacity.

The above-mentioned hot shaping die, cooling die, surface heating die, and hot coating die may each be a single metal die or consist of a plurality of metal dies.

Means for controlling the temperature of said hot shaping die, cooling die, surface heating die, or hot coating die is not particularly restricted but includes a plate heater, a band heater, a near-infrared heater, a far-infrared heater, and a temperature controller using oil, water, or the like as heat medium, for instance.

The intermediate layer mentioned above can be formed by further coupling another hot coating die directly to said upstream hot coating die directly coupled to the surface heating die.

The geometry of the molded article of the thermoplastic composite material obtainable by the production method of the invention is not particularly restricted, but in accordance with the production method of the invention, uniform and thin coating layers can be formed even if the molded articles are the profiles.

The profiles mentioned above are not particularly restricted but include articles having symmetric profiles, asymmetric profiles, or asymmetric hollow profiles in the sectional configuration thereof, for instance.

The wall thickness of said molded article of the thermoplastic composite material is preferably 1 to 50 mm. If it is less than 1 mm, the back pressure of extrusion will become too high to allow the speed of extrusion to be increased. If it exceeds 50 mm, the temperature difference in the thickness direction will be so great that no uniform cooling may be accomplished even with the combination of a primary cooling die and a secondary cooling die.

The molded article of the thermoplastic composite material obtainable by the production method of the invention may have a coating layer all over the surface of a core layer or have a coating layer only on a necessary area of the core layer. Usually, the surfaces perpendicular to the direction of extrusion are not provided with coating layers.

The method of producing a molded article of a thermoplastic composite material according to the present invention is now described, reference being had to the accompanying drawings.

FIG. 1 is a schematic side-elevation view showing an extrusion apparatus which can be used in the practice of the invention. The extrusion apparatus 7 comprises an extruder 1, such as corotating twin-screw extruder, which is a kneading means under heating for shaping a core layer for a molded article 8 of a thermoplastic composite material, a hot shaping die 2 connected downstream side of the extruder through an adapter, a cooling die 3 directly coupled to the hot shaping die 2, a surface heating die 4 directly coupled to the cooling die 3, a crosshead hot coating die 6 directly coupled to the surface heating die 4, and an extruder 5 connected to the hot coating die 6 for extruding a resin material to be used for a coating layer.

The thermoplastic composite material for the core layer as supplied to said extruder 1 is kneaded therein under heating and shaped by the hot shaping die 2. The shaped configuration is cooled to solidify in the cooling die 3 and, after its surface is heated by the surface heating die 4, fed to the hot coating die 6, where it is coated with a resin material for the coating layer as extruded from the extruder 5, whereby the molded article 8 of the thermoplastic composite material of the invention formed the coating layer thereon is obtained.

As shown in FIG. 2(c), said resin material is supplied onto the surface of the core layer via a supply passage 10 disposed in the hot coating die 6 directly coupled to the surface heating die 4.

To form and laminate a plurality of coating layers, another hot coating die may be directly coupled downstream of the sequence of the cooling die 3, surface heating die 4 and hot coating die 6.

Figure 13:
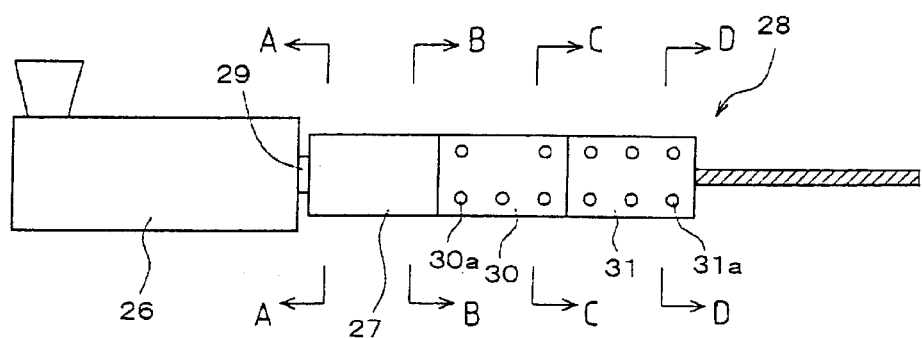
FIG. 13 is a schematic view illustrating an embodiment of the extrusion apparatus according to the invention.
Figure 14:
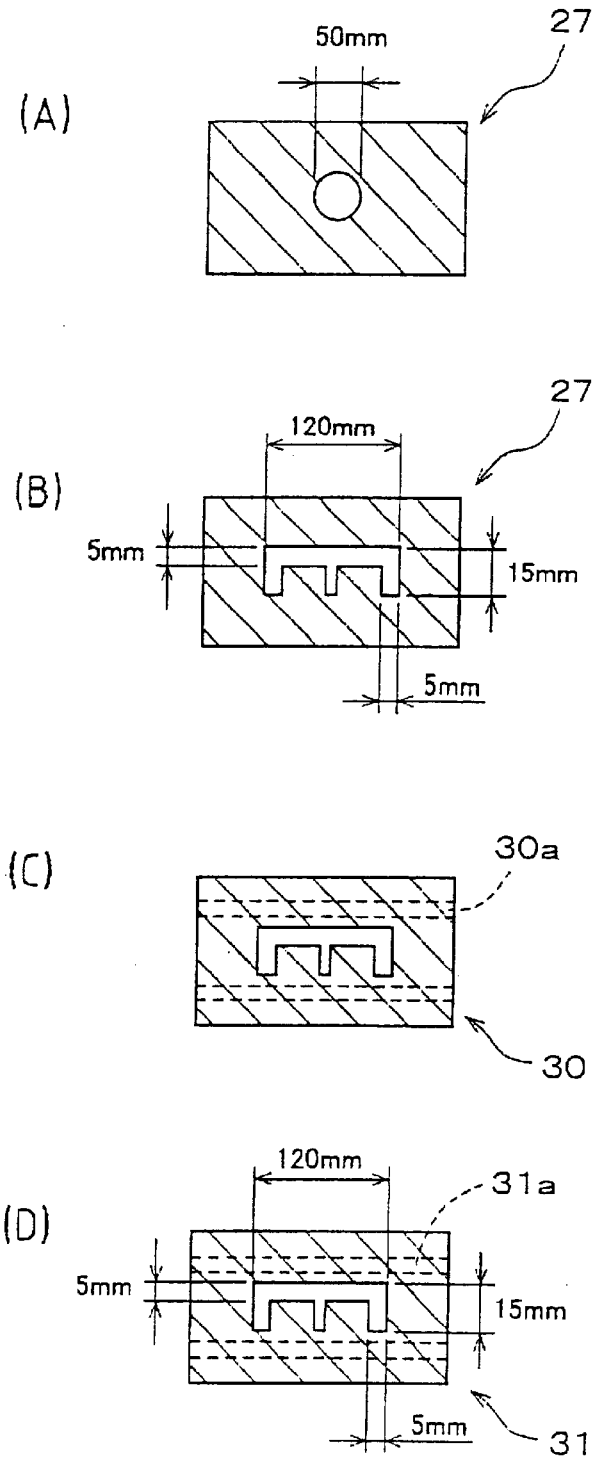
FIG. 14 is a schematic cross-section view showing each of the hot shaping die, primary cooling die, and secondary cooling die of the extrusion apparatus illustrated in FIG. 13.

Among the extrusion apparatus used in the method of producing a molded article of a thermoplastic composite material according to the invention, a specific embodiment using a counterrotating twin-screw extruder as the extruder is now described, reference being had to FIGS. 13 and 14.

The extrusion apparatus illustrated in FIG. 13 comprises a counterrotating twin-screw extruder 26, a hot shaping die 27 connected to the extruder 26 via an adapter 29, and a cooling die 28.

The counterrotating twin-screw extruder 26 is supplied with a thermoplastic composite material containing a thermoplastic resin and a vegetable filler. The counterrotating twin-screw extruder 26 is provided with temperature control means (not shown) for performing the temperature control of the extruder barrel (for example, 170° C.) using an electric heater and the temperature control of the extruder screws (for example, 160° C.) using constant-temperature oil, with which the temperature of the thermoplastic composite material at the extruder outlet can be controlled within the range of (melting point −15° C.) to (melting point +10° C.) of the thermoplastic resin.

The hot shaping die 27 and the cooling die 28 are directly coupled so that the thermoplastic composite material (molten state) extruded from the counterrotating twin-screw extruder 26 can be solidified/extruded. The cooling die 28 is composed of a primary cooling die 30 (cooling temperature: e.g. 150 to 180° C.) and a secondary cooling die 31 (cooling temperature: e.g. 60 to 140° C.). The primary cooling die 30 and secondary cooling die 31 are formed with cooling water flow-through means 30a and 31a, respectively.

The sectional configurations of the hot shaping die 27 (sectional views taken along the lines A—A and B—B) are the configurations shown in FIGS. 14(A) and (B). The sectional configuration of the primary cooling die 30 (sectional view taken along the line C—C) and the sectional configuration of the secondary cooling die 31 (sectional view taken along the line D—D) are identical to each other as shown in FIGS. 14 (C) and (D).

A molded article of a thermoplastic composite material as obtainable by the method of producing a molded article of a thermoplastic composite material according to the invention also constitutes another aspect of the present invention.

The molded article of the thermoplastic composite material according to the invention can be used in a broad uses such as various architectural members, furniture materials, and machine and appliance parts, etc. For example, the molded article of the thermoplastic composite material in thin plate form can be used as architectural members such as ornamental panels for home interior decoration.

BEST MODE FOR CARRYING OUT THE INVENTION

EXAMPLE 1

Using a corotating twin-screw extruder (PCM30, manufactured by Ikegai Kihan), 100 weight parts of the thermoplastic resin homopropylene (product of Japan Polychemical, Novatec MA3), 300 weight parts of the vegetable filler woodflour (Cellulosin No. 45, product of Watanabe Chemical, mean particle diameter 100 µm), and 5 weight parts of the lubricant zinc stearate (product of Sakai Chemical Ind., SZ2000) were kneaded together under heating at a barrel temperature of 180° C. and pelletized.

Figure 2:
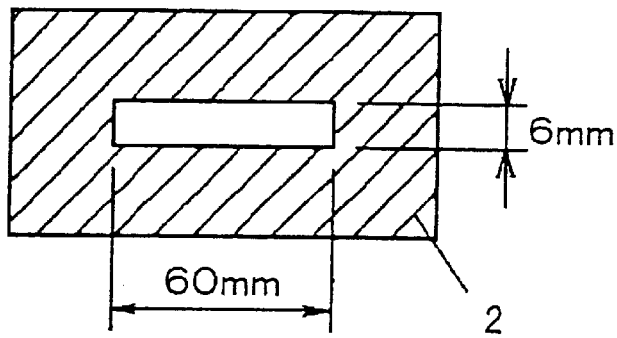
FIG. 2 is a sectional view showing an example of each metal die for use in the apparatus illustrated in FIG. 1, where (a) represents a hot shaping die, (b) represents a surface heating die, and (c) represents a hot coating die.
Figure 2:
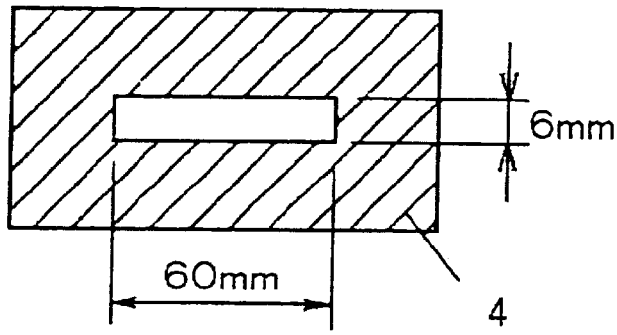
Figure 2:
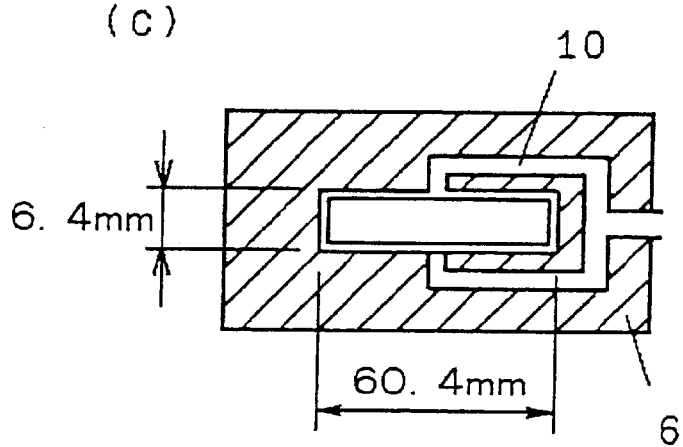

The pelletized starting material was fed to a single-screw extruder 1 (SLM50, manufactured by Hitachi Zosen Corporation) and, using an extrusion apparatus 7 shown in FIG. 1 equipped with a hot shaping die 2 (6×60 mm rectangular in section), a cooling die 3, a surface heating die 4 (6×60 mm rectangular in section), a crosshead hot coating die 6 (6.4×60.4 mm rectangular in section), and an extruder 5, all are shown in FIG. 2, the pelletized material was extruded.

The hot coating die 6 was supplied with poly(methylene methacrylate) (product of Sumitomo Chemical, LG6) from a single-screw extruder (VS30, manufactured by Ikegai Kihan) via a supply passage 10 as illustrated in FIG. 2 and the resin was extruded so as to form a 0.2 mm-thick coating layer on the whole longitudinal peripheral surface of the core layer, whereby a molded article 8 of a thermoplastic composite material having a rectangular cross-section was obtained.

EXAMPLE 2

Figure 3:
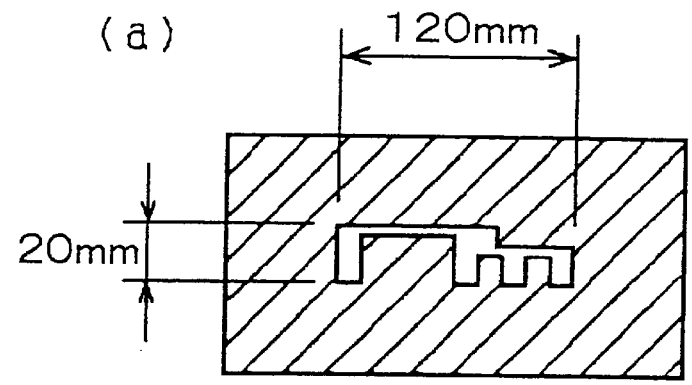
FIG. 3 is a sectional view showing another example of each metal die for use in the apparatus illustrated in FIG. 1, where (a) represents a hot shaping die, (b) represents a surface heating die, and (c) represents a hot coating die.
Figure 3:
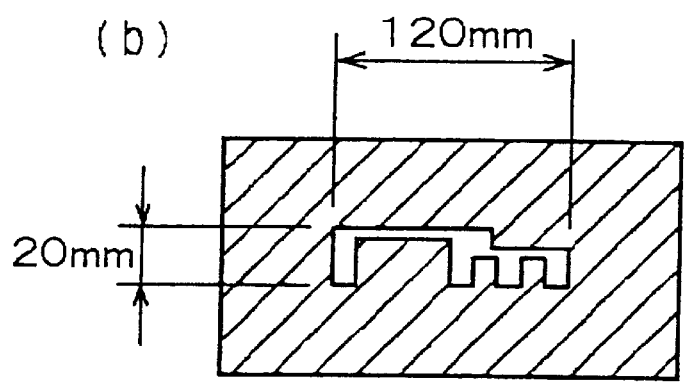
Figure 3:
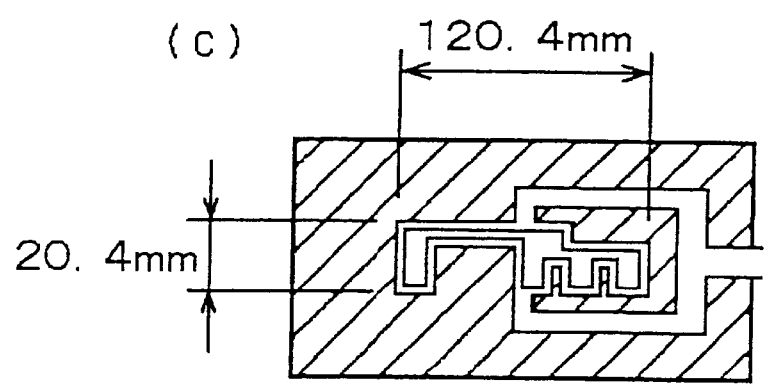

Except that a core layer was extruded and shaped using the hot shaping die (profile die), cooling die (profile die, not shown because it is of the same configuration as the surface heating die), surface heating die (profile die) and hot coating die (profile die) as metal dies, all shown in FIG. 3, and then the resin material supplied from the extruder 5 (FIG. 1) was extruded using a crosshead hot coating die (profile die) to coat the core layer, the procedure of Example 1 was otherwise repeated to provide a molded article of a thermoplastic composite material having a special profile cross-section.

EXAMPLE 3

Except that each of the metal dies shown in FIG. 3 was used and a homopropylene (product of Japan Polychemical, Novatec MA3) was used as the resin for the coating layer, the procedure of Example 1 was otherwise repeated to provide a molded article of the thermoplastic composite material having a special profile cross-section.

EXAMPLE 4

Except that each of the metal dies shown in FIG. 3 was used and a homopropylene (product of Japan Polychemical, Novatec MA3) and a weather resistance-improving agent (product of Matsuura Chemical; AL103, formulated at a level of 1 weight % relative to the homopropylene) were used as the resin for the coating layer, the procedure of Example 1 was otherwise repeated to provide a molded article of the thermoplastic composite material having a special profile cross-section.

Comparative Example 1

Using a corotating twin-screw extruder (PCM30, manufactured by Ikegai Kihan), 100 weight parts of the thermoplastic resin homopropylene (product of Japan Polychemical, Novatec MA3), 300 weight parts of the vegetable filler woodflour (Cellulosin No. 45, product of Watanabe Chemical, mean particle diameter 100 µm), and 5 weight parts of the lubricant zinc stearate (product of Sakai Chemical Ind., SZ2000) were kneaded together under heating at a barrel temperature of 180° C. and pelletized.

The pelletized starting material was fed to a single-screw extruder (SLM50, manufactured by Hitachi Zosen Corporation) and extruded using the hot shaping die 2 (6×60 mm rectangular in section) and cooling die 3 shown in FIG. 2 but not using the surface heating die and hot coating die.

Except that it had no coating layer on the surface, the molded article thus obtained was comparable to the molded article of the thermoplastic composite material obtained in Example 1.

Comparative Example 2

Using a corotating twin-screw extruder (PCM30, manufactured by Ikegai Kihan), 100 weight parts of the thermoplastic resin homopolypropylene (product of Japan Polychemical, Novatec MA3), 300 weight parts of the vegetable filler woodflour (Cellulosin No. 45, product of Watanabe Chemical, mean particle diameter 100 μm), and 5 weight parts of the lubricant zinc stearate (product of Sakai Chemical Ind., SZ2000) were kneaded together under heating at a barrel temperature of 180° C. and pelletized.

Figure 4:
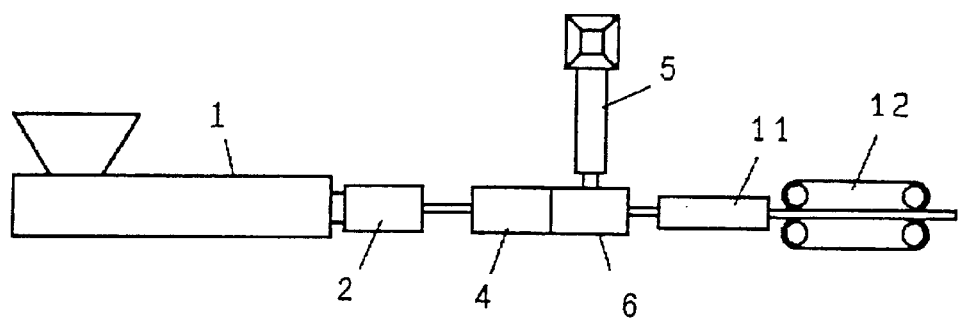
FIG. 4 is a schematic side-elevation view showing an example of the extrusion apparatus used in Comparative Example 2.
Figure 5:
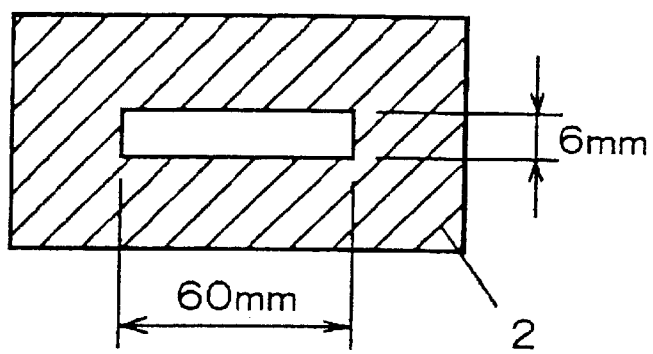
FIG. 5 is a sectional view showing an example of each metal die for use in the apparatus illustrated in FIG. 4, where (a) represents a hot shaping die, (b) represents a surface heating die, and (c) represents a hot coating die.
Figure 5:
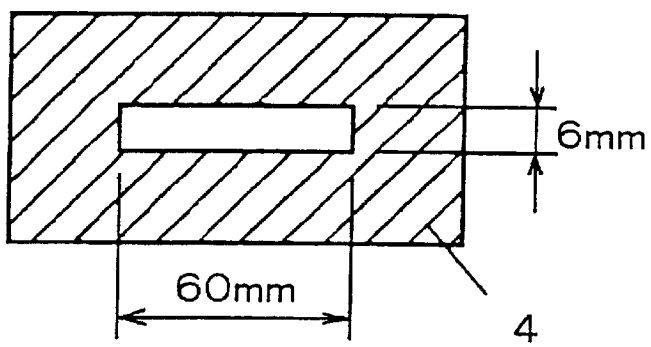
Figure 5:
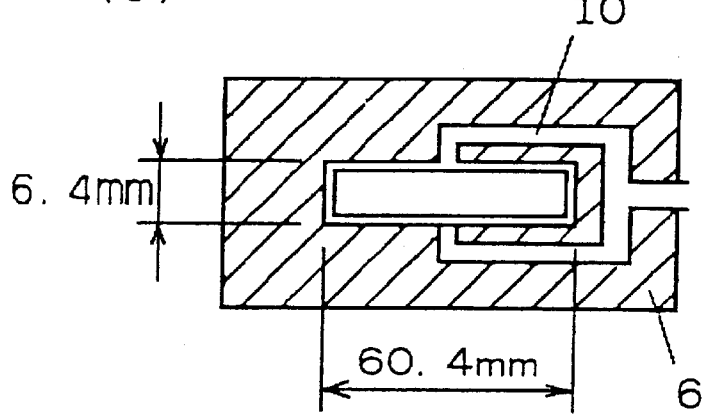

The pelletized starting material was fed to a single-screw extruder 1 (SLM50, manufactured by Hitachi Zosen Corporation) and extruded using the extrusion apparatus illustrated in FIG. 4 equipped with a hot coating die 6, which is separated from the hot shaping die 2 (6×60 mm rectangular in section), a cooling tank 11, and a take-off device 12 (FIG. 5).

The hot coating die 6 was supplied with poly(methylene methacrylate) (product of Sumitomo Chemical, LG6) from a single-screw extruder (VS30, manufactured by Ikegai Kihan) via a supply passage 10 as illustrated in FIG. 5 and the resin was extruded so as to form a 0.2 mm-thick coating layer on the whole longitudinal peripheral surface of the core layer, whereby a molded article of a thermoplastic composite material having a rectangular profile was obtained.

A 1 m-long sample of the molded article obtained in each of the above Examples and Comparative Examples was subjected to one-year-long outdoor exposure and the color difference (ΔE) between the color before outdoor exposure and the color after exposure was evaluated. The evaluation results were presented in Table 1. The evaluation of color difference (ΔE) was made using a spectrophotometer (manufactured by Tokyo Denshoku, TC-1800).

TABLE 1

| | Color Difference (ΔE) |
|---|---|
| Ex. 1 | 0.1 |
| Ex. 2 | 0.1 |
| Ex. 3 | 0.5 |
| Ex. 4 | 0.2 |
| Compar. Ex. 1 | 42 |
| Compar. Ex. 2 | Extrusion was not feasible |

EXAMPLE 5

Using a corotating twin-screw extruder (PCM30 extruder, manufactured by Ikegai Kihan), 100 weight parts of the thermoplastic resin polypropylene (Novatec MA3, product of Japan Polychemical), 150 weight parts of the vegetable filler Cellulosin No. 45 (mean particle diameter: 45 mesh, product of Watanabe Chemical), and 5 weight parts of the lubricant zinc stearate (SZ2000, product of Sakai Chemical Ind.) were kneaded together under heating at a barrel temperature of 180° C. and pelletized to give pellets of a thermoplastic composite material.

Figure 6:
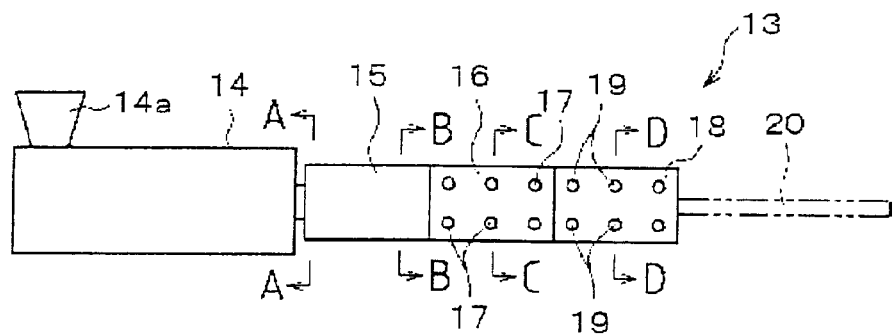
FIG. 6 is a schematic view illustrating the extrusion apparatus and production process for a thermoplastic resin composite material according to the first aspect of the invention.

Using the extrusion apparatus 13 illustrated in FIG. 6, the pelletized thermoplastic composite material was fed to the hopper 14*a* of a single-screw extruder 14 (SH50, manufactured by Hitachi Zosen Corporation) with its barrel temperature set to 180° C. and extruded through a series of extruder 14, hot shaping die 15, primary cooling die 16 (160° C., constant-temperature oil control type), and secondary cooling die 18 (120° C., constant-temperature water control type).

Figure 7:
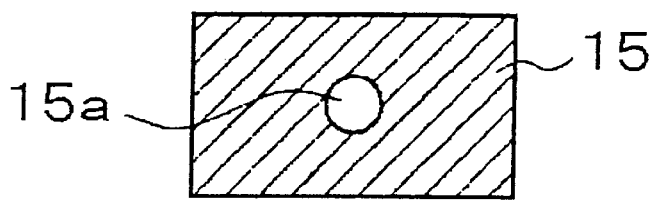
FIG. 7 is a longitudinal section view taken along the line A—A of the shaping die of the extrusion apparatus for a thermoplastic resin composite material according to the first aspect of the invention.
Figure 8:
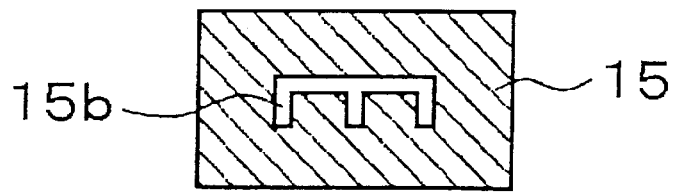
FIG. 8 is a longitudinal section view taken along the line B—B of the shaping die of the extrusion apparatus for a thermoplastic resin composite material according to the first aspect of the invention.
Figure 9:
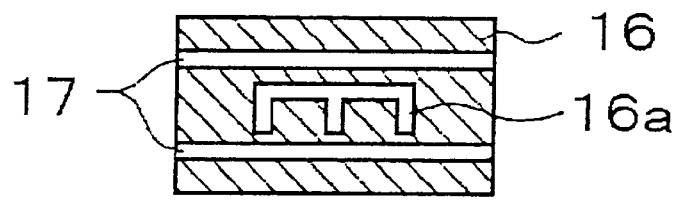
FIG. 9 is a longitudinal section view taken along the line C—C of a primary cooling die of the extrusion apparatus for a thermoplastic resin composite material according to the first aspect of the invention.
Figure 10:
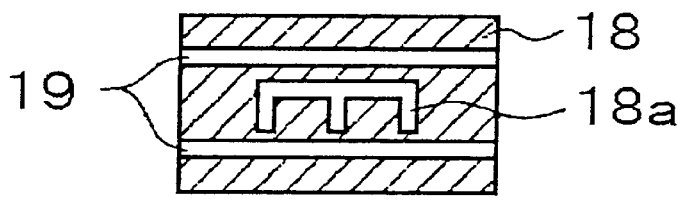
FIG. 10 is a longitudinal section view taken along the line D—D of a secondary cooling die of the extrusion apparatus for a thermoplastic resin composite material according to the first aspect of the invention.

In the extrusion apparatus 13, the hot shaping die 15 was equipped with an extrusion opening 15*a* (diameter: 50 mm) in the forward position thereof as shown in FIG. 7 and a shaping die 15*b* (120 mm in width×15 mm in length×5 mm in depth) in the rearward position thereof as shown in FIG. 8. The primary cooling die 16 was equipped with a shaping die 16*a* (120 mm in width×15 mm in length×5 mm in depth) and flow-through pipes 17 each above and below the shaping die 16*a* as illustrated in FIG. 9. The secondary cooling die 18 was equipped with a shaping die 18*a* (120 mm in width×15 mm in length×5 mm in depth) and flow-through pipes 19 each above and below the shaping die 18*a* as illustrated in FIG. 10. The reference numeral 20 indicates a molded article of a thermoplastic composite material as extruded.

EXAMPLE 6

Except that the amount of the vegetable filler Cellulosin No. 45 used in Example 5 was changed to 50 weight parts and a pelletized thermoplastic composite material was obtained, the extrusion was carried out as the same procedure of Example 5.

EXAMPLE 7

Figure 11:
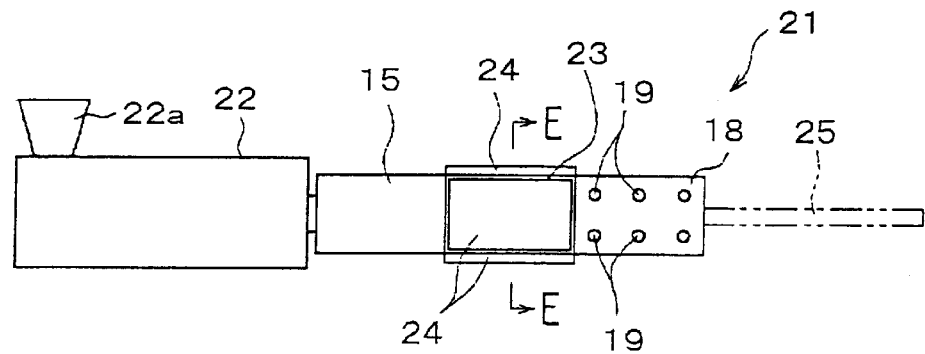
FIG. 11 is a schematic view illustrating the extrusion apparatus and production process for a thermoplastic resin composite material according to the second aspect of the invention.

Using the extrusion apparatus 21 illustrated in FIG. 11, the pelletized thermoplastic composite material according to Example 5 was fed to the hopper 22*a* of a single-screw extruder 22 (SH50, manufactured by Hitachi Zosen Corporation) with its barrel temperature set to 180° C. and extruded through a series of the extruder 22, hot shaping die 15, primary cooling die 23 (160° C., electric heater temperature control type), and secondary cooling die 18 (120° C., constant-temperature water control type).

Figure 12:
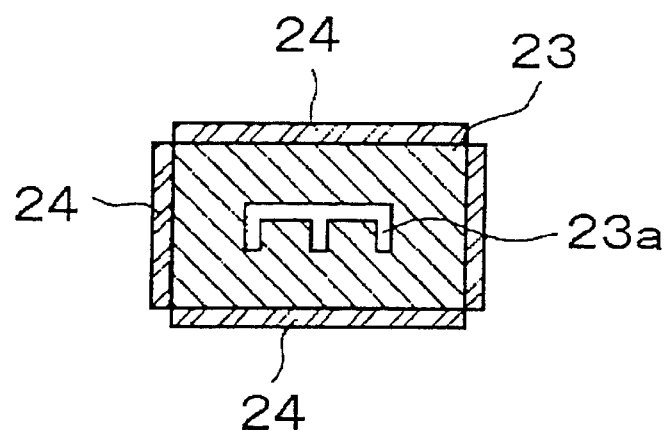
FIG. 12 is a longitudinal section view taken along the line E—E of a primary cooling die of the extrusion apparatus for a thermoplastic resin composite material according to the second aspect of the invention.

In the extrusion apparatus 21, the primary cooling die 23 was provided with electric heaters 24 disposed around the shaping die 23*a* (120 mm in width×15 mm in length×5 mm in depth) in a constant interval as illustrated in FIG. 12. The reference numeral 25 indicates a molded article of a thermoplastic composite material as extruded.

Reference Example 1

Except that a primary cooling die 16 (120° C., constant-temperature oil control type) and a secondary cooling die 18 (120° C., constant-temperature oil control type) were used in the extrusion process in Example 5, extrusion was carried out in otherwise the same manner as in Example 5.

Reference Example 2

Except that a primary cooling die 16 (190° C., electric heater control type) and a secondary cooling die 18 (120° C., constant-temperature water control type) were used in the extrusion processes in Example 7, extrusion was carried out in otherwise the same manner as in Example 7.

Reference Example 3

Except that a primary cooling die 16 (140° C., constant-temperature oil control type) and a secondary cooling die 18 (50° C., constant-temperature water control type) were used in the extrusion processes in Example 5, extrusion was carried out in otherwise the same manner as in Example 5.

Reference Example 4

Except that a primary cooling die 16 (160° C., constant-temperature oil control type) and a secondary cooling die 18 (120° C., constant-temperature water control type) were used in the extrusion processes in Example 5, extrusion was carried out in otherwise the same manner as in Example 5.

Reference Example 5

Except that a primary cooling die 16 (160° C., constant-temperature oil control type) and a secondary cooling die 18 (150° C., constant-temperature oil control type) were used in the extrusion processes in Example 5, extrusion was carried out in otherwise the same manner as in Example 5.

In each of the extrusion processes according to Examples 5 to 7 and Reference Examples 1 to 5, the maximum linear speed (cm/min) of extrusion was determined and evaluated. The results are shown in Table 2. The term "maximum linear speed" means the highest extrusion linear speed value obtainable over the range in which a cooled and solidified article could be extruded, that is to say the value obtainable when the sectional configuration of the extruded article is within ±0.5 mm of the designed configuration for each of vertical dimension, horizontal dimension, and thickness dimension.

TABLE 2

| Example No. | | Cooling temp. (° C.) | | Max. linear speed (cm/min) |
|---|---|---|---|---|
| | | Primary cooling die | Secondary cooling die | |
| Ex. | 5 | 160 | 120 | 53.0 |
| | 6 | 160 | 120 | 40.0 |
| | 7 | 160 | 120 | 51.0 |
| Compar. Ex. | 1 | 120 | 120 | 5.1 |
| | 2 | 190 | 120 | 6.3 |
| | 3 | 140 | 120 | 8.0 |
| | 4 | 160 | 120 | 4.7 |
| | 5 | 160 | 150 | 11.8 |

It was confirmed from the results given in Table 2 that compared with Reference Examples 1 to 5, the maximum extrusion linear speed is extremely high in Examples 5 to 7.

EXAMPLE 8

Thermoplastic resin: PP (product of Japan Polychemical, Novatec MA3) 100 weight parts, vegetable filler: woodflour Cellulosin No. 45 (product of Watanabe Chemical, mean particle diameter 45 mesh), 200 weight parts Lubricant: zinc stearate (product of Sakai Chemical Ind., SZ2000), 5 weight parts Using a PCM30 extruder (corotating twin-screw extruder, manufactured by Ikegai Kihan), the above thermoplastic resin, vegetable filler, and lubricant were kneaded together under heating at a barrel temperature of 180° C. and pelletized.

The pelletized starting material was then fed to a counterrotating twin-screw extruder (SLM45C, manufactured by Sekisui Koki, barrel temperature 170° C., screw oil temperature control 160° C.) and solidified/extruded using a hot shaping die 27 (6×60 mm, 180° C.), a primary cooling die 30 (oil temperature control 160° C.), and a secondary cooling die 31 (oil temperature control 120° C.) as shown in FIG. 13. It should be noticed that the temperature of the thermoplastic composite material at the outlet of the counterrotating twin-screw extruder was adjusted to 160° C. (the melting point of PP 165° C.).

The temperature of the thermoplastic composite material was adjusted by controlling the barrel temperature and the screw oil temperature. The temperature of the thermoplastic composite material was measured with a resin temperature sensor (product of Rika Kogyo, RKC sensor) attached to an adapter 29 at the extruder outlet.

In this Example 8, the maximum linear speed during extrusion was 65 cm/min.

EXAMPLE 9

Except that a counterrotating twin-screw extruder (SLM90E, manufactured by Sekisui Koki, barrel temperature 170° C., screw oil temperature control 160° C., caliber-up type) was used in the extrusion of the pelletized starting material according to Example 8, solidification/extrusion was carried out in the same manner as in Example 8. The maximum linear speed during extrusion was 95 cm/min.

Comparative Example 3

Except that the amount of loading with the vegetable filler used in Example 9 was adjusted to 200 weight parts, melt-extrusion was carried out in the same manner as in Example 9. The maximum linear speed during extrusion was 53 cm/min.

Reference Example 6

Except that the counterrotating twin-screw extruder was set to a barrel temperature of 190° C. and a screw oil temperature control of 180° C. and that the temperature of the thermoplastic composite material at the extruder outlet was set to 180° C. (the melting point of PP 165° C.) in Example 8, solidification/extrusion was carried out in the same manner as in Example 8. The maximum linear speed during extrusion was 10.5 cm/min.

Reference Example 7

Except that the counterrotating twin-screw extruder was set to a barrel temperature of 150° C. and a screw oil temperature control of 140° C. and that the temperature of the thermoplastic composite material at the extruder outlet was set to 145° C. (the melting point of PP 165° C.) in Example 8, solidification/extrusion was carried out in the same manner as in Example 8. The maximum linear speed during extrusion was 22 cm/min.

Reference Example 8

Except that a single-screw extruder (SH50, manufactured by Hitachi Zosen Corporation, barrel temperature 190° C.) was used for extrusion of the pelletized starting material and that the temperature of the thermoplastic composite material at the extruder outlet was set to 180° C. (the melting point of PP 165° C.) in Example 8, solidification/extrusion was carried out in otherwise the same manner as in Example 8. The maximum linear speed during extrusion was 8.2 cm/min.

Reference Example 9

Except that a single-screw extruder (SH50, manufactured by Hitachi Zosen Corporation, barrel temperature 160° C.) was used for extrusion of the pelletized starting material and that the temperature of the thermoplastic composite material at the extruder outlet was set to 160° C. (the melting point of PP 165° C.) in Example 8, solidification/extrusion was carried out in otherwise the same manner as in Example 8. However, molding was infeasible because of torque overloading.

Reference Example 10

Except that a corotating twin-screw extruder (TEX44, manufactured by the Japan Steel Works, barrel temperature 160° C.) was used for extrusion of the pelletized starting material and that the temperature of the thermoplastic composite material at the extruder outlet was set to 160° C. (the melting point PP 165° C.) in Example 8, solidification/extrusion was carried out in otherwise the same manner as in Example 8. However, molding was infeasible because of torque overloading.

A sample was cut out of the extruded article (molded article of the thermoplastic composite material) obtained in each of the above Examples 8 and 9, Comparative Example 3, and Reference Examples 6 to 10 and each sample was subjected to the determination of flexural strength according to JIS K 7203. The results are shown below in Table 3.

TABLE 3

| | Max. linear speed (cm/min) | Flexural strength (Mpa) |
|---|---|---|
| Ex. 8 | 65 | 61 |
| Ex. 9 | 95 | 60 |
| Compar. Ex. 3 | 53 | 53 |
| Ref. Ex. 6 | 10.5 | 58 |
| Ref. Ex. 7 | 22 | 21 |
| Ref. Ex. 8 | 8.2 | 30 |
| Ref. Ex. 9 | Molding infeasible because of torque overloading | — |
| Ref. Ex. 10 | Molding infeasible because of torque overloading | — |

It was confirmed from the above Examples, Comparative Example, and Reference Examples that by controlling the temperature of the thermoplastic composite material at the extruder outlet within the range of (melting point −15° C.) to (melting point +10° C.), the molding speed (productivity) was increased in comparison with the conventional molding method.

It was also be apparent from the data presented in Table 3 that the molded article of the thermoplastic composite material as molded by controlling the temperature of the thermoplastic composite material at the extruder outlet within the range of (melting point −15° C.) to (melting point +10° C.) was superior to the conventional molded article (Comparative Example) in physical property (flexural strength).

Reference Example 11

Using an extruder, 100 weight parts of the thermoplastic resin polypropylene (product of Japan Polychem, Novatec PP), 100 weight parts of the cellulose powder KC Floc (product of Nippon Paper Industries), and 5 weight parts of the maleic anhydride-modified polypropylene (product of Sanyo Chemical Industries, Yumex) were kneaded together and molded to prepare a 1 mm-thick coating layer (sheet).

Then, using an extruder, 100 weight parts of polypropylene (product of Japan Polychem, Novatec PP), 100 weight parts of woodflour 100-mesh pass, and 5 weight parts of maleic anhydride-modified polypropylene (product of Sanyo Chemical Industries, Yumex) were kneaded together and molded to prepare a 3 mm-thick sheet member. The above coating layer was fused to the surface of this sheet member to provide a woodflour-containing molded article.

Comparative Example 4

Using an extruder, 100 weight parts of the thermoplastic resin polypropylene (product of Japan Polychem, Novatec PP), 100 weight parts of the woodflour 100-mesh pass, and 5 weight parts of maleic anhydride-modified polypropylene (product of Sanyo Chemical Industries, Yumex) were kneaded together and molded to give a woodflour-containing molded article in the form of a 3 mm-thick sheet.

Evaluations

The woodflour-containing molded article obtained in the above Reference Example 11 and the woodflour-containing molded article obtained in Comparative Example 4 were evaluated for wood-like texture and weather resistance as below. The evaluation results are presented below in Table 4.

Evaluation of Wood-like Texture

The wood-like texture of the surface of each woodflour-containing molded article was evaluated by a tactile sensory test.

Evaluation of Weather Resistance

From the woodflour-containing molded articles, 120 mm-long, 20 mm-wide samples were prepared, respectively, and subjected to a 200-hour accelerated weather resistance test in accordance with JIS A 1415 (sunshine accelerated test). The color difference between the color before the test and the color after the test was determined.

TABLE 4

| | Wood-like texture | Color difference (ΔE) |
|---|---|---|
| Ref. Ex. 11 | ○ | 1.79 |
| Compar. Ex. 4 | ○ | 32.50 |

It was apparent from the results given in Table 4 that although Reference Example 11 and Comparative Example 4 are equivalent in wood-like texture, Reference Example 11 is definitely superior in weather resistance.

EXAMPLE 10

Figure 15:
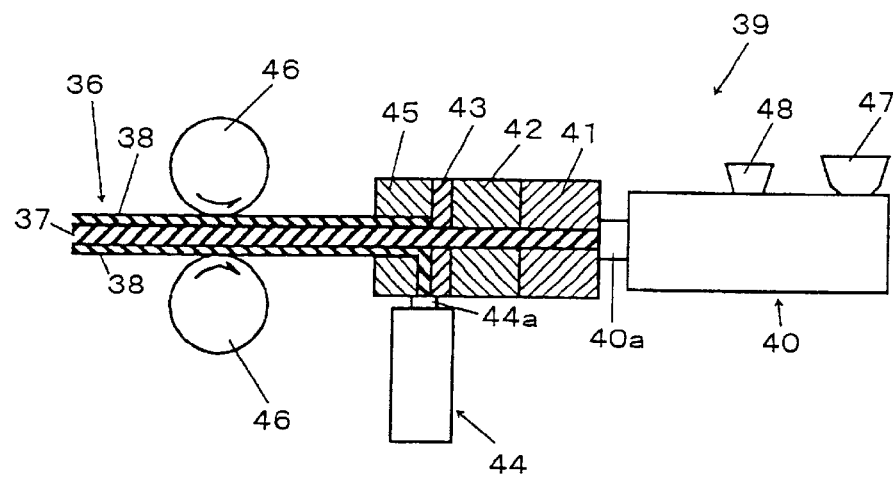
FIG. 15 is an elementary view showing the production apparatus for molded resin articles according to Example 10 and Example 11 of the invention.
Figure 16:
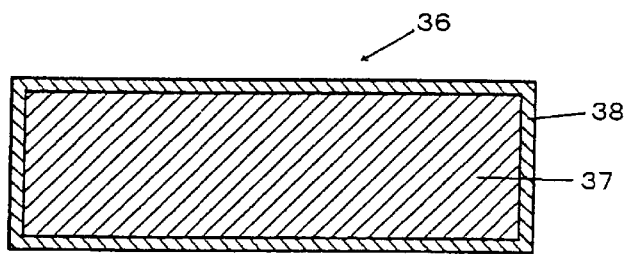
FIG. 16 is a longitudinal section view showing the molded resin articles according to Examples 10 to 13 of the invention.

FIG. 15 shows an extrusion apparatus 39 for the production of a bilayer molded article 36 of a thermoplastic composite material comprising a core layer 37 and a coating layer 38 as illustrated in FIG. 16. This apparatus 39 was equipped with a first extruder 40 for molding the core layer 37, a hot shaping die 41, a cooling die 42, a surface heating die 43 for preliminary heating prior to coating and molding of the coating layer 38, a second extruder 44 for molding the coating layer 38, a crosshead hot coating die 45 adapted to effect cooling and shaping as well, and an abrasive device 46 for modifying the surface of the coating layer 38 after molding a molded article 36 of a thermoplastic composite material.

Using a corotating twin-screw extruder (manufactured by the Japan Steel Works, TEX44) as the first extruder 40 for molding the core layer 37 and polypropylene (product of Japan Polychem, Novatec PP, m.p. 165° C.) as the thermoplastic composite material for the core layer 37, 100 weight parts of said polypropylene was fed to the first extruder 40 via a main starting material inlet 47 and, then, 200 weight parts of the filler woodflour (45 mesh) was fed via an auxiliary starting material inlet 48.

Meanwhile, using a single-screw extruder (manufactured by Ikegai Kihan, VS30) as the second extruder 44 for molding the coating layer 38, a resin material comprising a mixture of the same polypropylene (resin A) having a melting point of 165° C. as above and a polyester resin (resin B) having a melting point of 220° C. was fed via a material inlet of the second extruder 44.

The hot shaping die 41 attached to the extrusion head 40a of the first extruder 40 was controlled at a constant temperature of 200° C. and the molten resin material extruded at a molding temperature of 200° C. was shaped to a predetermined configuration while it was kept in molten state during its passage through the hot shaping die 41. The resin was then cooled and shaped while it passed through the cooling die 42 which was directly connected to said hot shaping die 41 and controlled at a constant temperature of 100° C., whereby the core layer 37 of self-standing consistency was obtained.

The surface-heating die 43, controlled at a constant temperature of 150° C., reheated the surface of the core layer 37 once cooled and shaped in said cooling die 42. The resin material comprising said mixture of resin A and resin B was supplied to the hot coating die 45 attached to the extrusion head 44a of the second extruder 44 at an extrusion temperature of 220° C. to coat and laminate on the peripheral surface of the core layer 37 in said hot coating die 45 controlled at a constant temperature of 200° C. As a result, there was obtained a molded article of a thermoplastic composite material in the form of a board having a 5.0 mm-thick core layer 37 and a 0.5 mm-thick coating layer 38 or a total thickness of 6.0 mm and a width of the board of 50 mm.

Using a nylon buffing roll (#400) attached to the free end of a motor shaft as said abrasive device 46, with the abrasive device 46 being disposed horizontally with respect to the surface of the molded article 36 of the thermoplastic composite material, the motor was continuously driven to rotate the abrasive device 46 in the direction indicated by the arrowmark in FIG. 15, whereby the surface of the coating layer 38 of the molded article 36 of the thermoplastic composite material was grinded all over the entire surface in the width direction of the board to apply scratch marks simulating a wood grain pattern oriented in one and the same direction.

EXAMPLE 11

A decorating roll of sandpaper (#80) specification was used as said abrasive device in lieu of the nylon buffing roll used in Example 10, scratch marks simulating a wood grain pattern oriented in one and the same direction were applied.

Reference Example 12

The surface of the molded article of the thermoplastic composite material obtained by the extrusion apparatus in Example 10 was not modified by using an abrasive device.

The results of evaluation of the molded articles of the thermoplastic composite material according to Example 10, Example 11, and Reference Example 12 are presented in Table 5. It was apparent from the evaluation results that the molded articles of thermoplastic composite material of Examples 10 and 11 to which surface grinding was carried out using the abrasive device were finer in surface roughness and superior in surface properties as compared with the article of Reference Example 12. Moreover, when each article was subjected to a 1000-hour accelerated exposure test using sunshine weather-o-meter for evaluation of weather resistance and the surface color difference of the molded article between the color before said test and the color after the test was determined and calculated, the color differences of the articles obtained in Examples 10 and 11 were invariably as low as not more than 3. The water absorption rates were also quite low. It was, therefore, clear that these articles were very satisfactory in durability. Furthermore, compared with Reference Example 12, the above Examples were superior in wood-like texture, both in visual and tactile.

TABLE 5

| | Surface roughness (μm) | Weather resistance (100 hr), Sunshine weather-o-meter | Water absorption test (%) 25° C. × 30d | Wood-like texture, visual | Wood-like texture, tactile |
|---|---|---|---|---|---|
| Ex. 10 | 20.3 | Color difference ΔE = 3.0 | 0.05 | ○ | ○ |
| Ex. 11 | 35.8 | 2.5 | 0.05 | ○ | ○~◎ |
| Ref. Ex. 12 | 59.7 | 1.8 | 0.05 | Δ~○ | Δ~○ |

EXAMPLE 12

Figure 17:
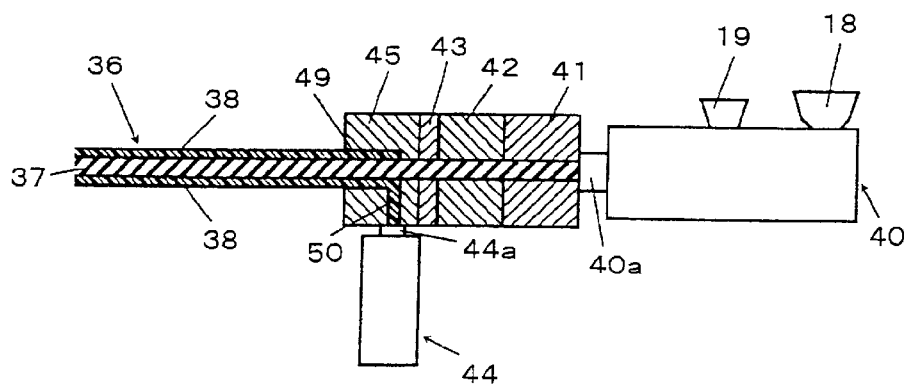
FIG. 17 is an elementary view showing the production apparatus for molded resin articles according to Example 12 and Example 13 of the invention.

The molded article of the thermoplastic composite material according to Example 12 was a bilayer structure as molded using the extrusion apparatus 39 illustrated in FIG. 17. This extrusion apparatus 39 and production method were similar to those used in the above Example 10 except that no abrasive device was used and that the hot coating die was different in structure and, therefore, a detailed description of other aspects is omitted.

Figure 18:
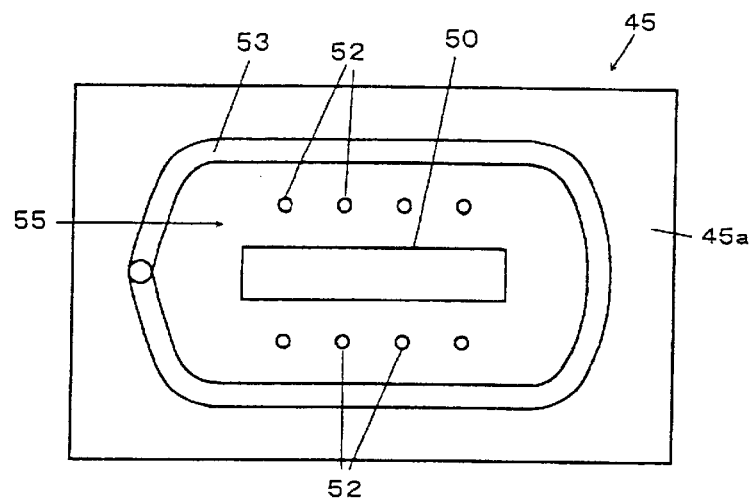
FIG. 18 is a front view showing the matching surface of one of the metal die members of the coating metal die according to Example 12 of the invention.
Figure 19:
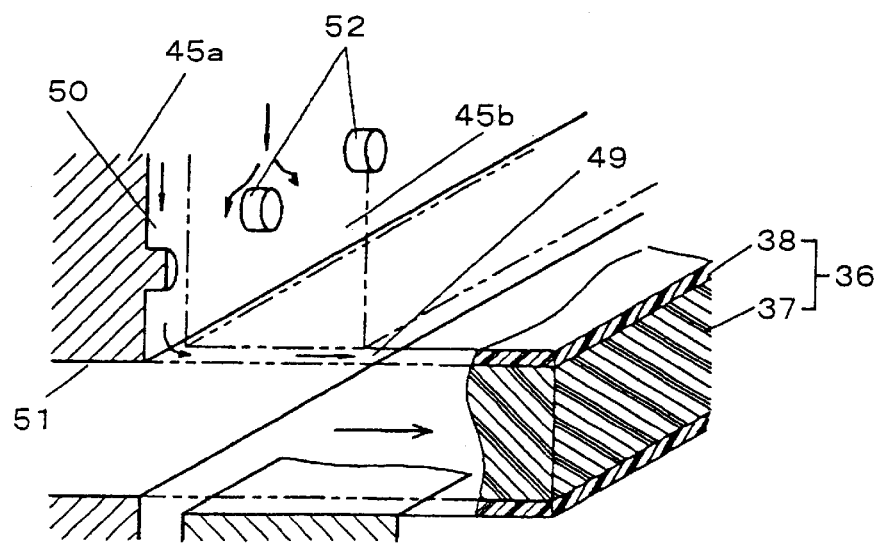
FIG. 19 is a perspective sectional view showing the cardinal part of the same coating metal die.

As illustrated in FIGS. 18 and 19, the hot coating die 45 according to this Example was equipped with a shaping passage 49 for the resin material to constitute the coating layer 38 and a supply passage 50 for supplying said resin material to said shaping passage 49. The above supply passage 50 was disposed in perpendicular relation to the shaping passage 49 and constructed as a slit extending the entire coating width of the coating layer 38 on the core layer 37, that is to say the entire board width of the board material 36 which is the molded article of the thermoplastic composite material. As more specifically illustrated in FIG. 19, the hot coating die 45 was equipped with a first metal die member 45a on the upstream side and a second metal die member 45b on the downstream side, these first metal die member 45a and second metal die member 45b being disposed with a predetermined clearance therebetween, and said clearance constituting the supply passage 50. The first metal die member 45a is formed with a substrate passage opening 51 of the same configuration and size as the core layer 37. In addition, a predetermined clearance was also provided between the second metal die member 45b and the core layer 37 to constitute said shaping passage 49.

The first die member 45a mentioned above was provided with a projection 52 disposed within the supply passage 50 and protruding in the thickness direction of the passage, said projection 52 being adapted to vary and control the resin flow within the supply passage 50. This projection 52 was disposed in a plural number (4 in the illustrated example) on each of the face and reverse sides of the board material which was the molded article of the thermoplastic composite material. The arrangement of such a plurality of projections 52 was not restricted but, in the illustrated example, the projections were disposed in generally constant intervals along a straight line on both the face and reverse sides of the board. In this Example, the passage thickness (clearance) of said supply passage 50 was 1 mm, the configuration of each projection 52 was generally cylindrical, the diameter of the projection 52 was 2 mm, the height of the projection was 0.3 mm, and the interval of projections 52 was 10 mm.

In addition, as illustrated in FIG. 18, the first metal die member 45a was formed with a substrate passage opening 51 and an annular groove (main manifold) 32 surrounding said plurality of projections 52 so that the resin material extruded from the second extruder 44 flowed down the annular groove 53 to the entire periphery of the core layer 37 and, then, into said slit-like supply passage 50 from the annular groove 53. The resin flow modified by the projections 52 was supplied to the peripheral surface of the core layer 37 and shaped to form a coating layer 38 of predetermined thickness in the shaping passage 49.

Figure 22:
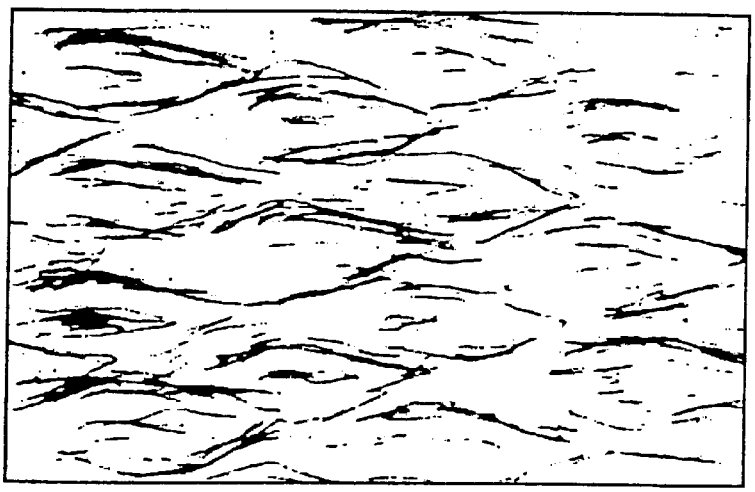
FIG. 22 (*a*) is a plan view showing the surface pattern of the molded resin article produced in accordance with the production method in Example 12 and (*b*) is a plan view showing the surface pattern of the molded resin article produced in accordance with the production method in Example 13.
Figure 22:
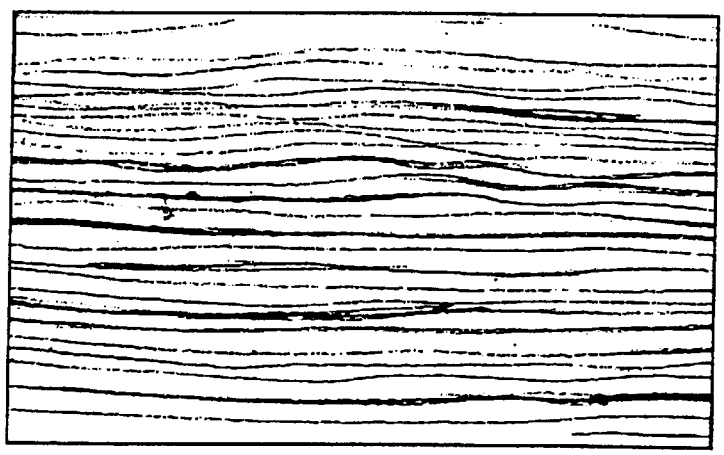

When the molded article 36 of the thermoplastic composite material was molded using the extrusion apparatus of this Example under the above molding conditions, there was obtained a coating layer 38 with a scale-like regular design as illustrated in FIG. 22 (*a*).

EXAMPLE 13

Figure 20:
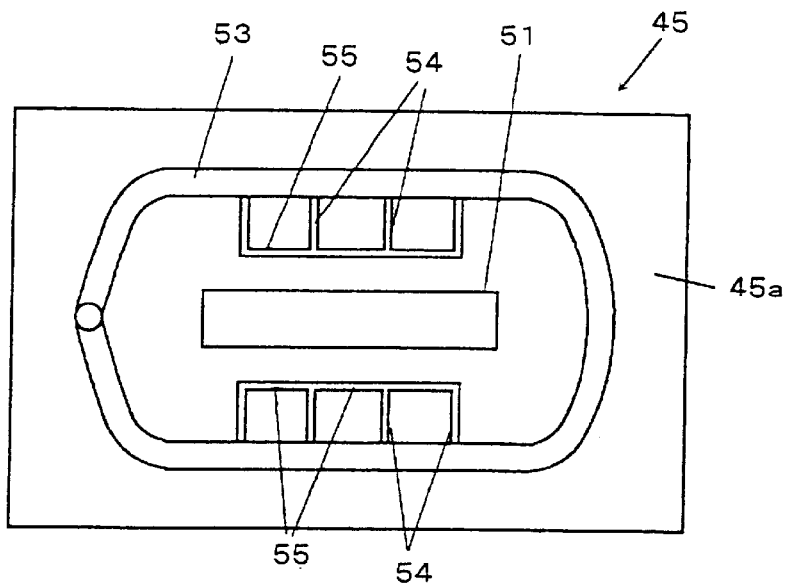
FIG. 20 is a front view showing the matching surface of one of the metal die members of the coating metal die according to Example 13 of the invention.
Figure 21:
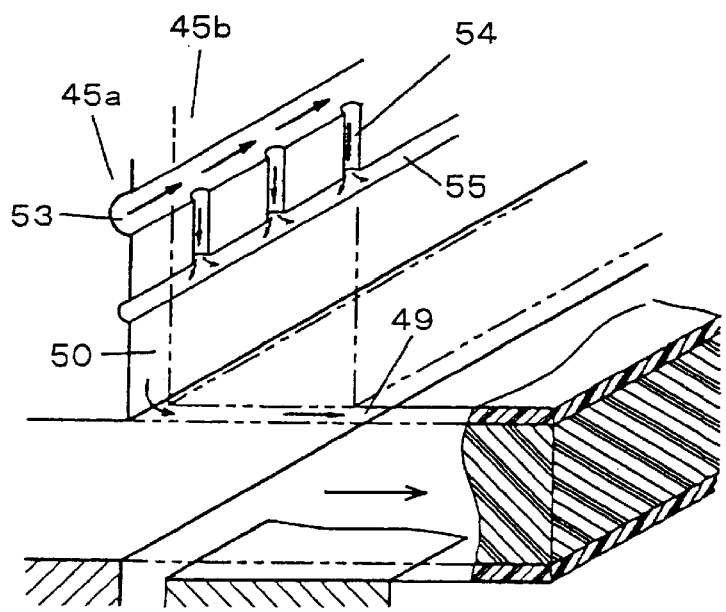
FIG. 21 is a perspective sectional view showing the cardinal part of the same coating metal die.

In an extrusion apparatus according to Example 13, the hot coating die 45 used in the above Example 12 was changed to the die illustrated in FIGS. 20 and 21. This hot coating die was a hot coating die 45 which supplies the outermost layer resin by extruding in a vertical direction with respect to the core layer 3, which is a virtually rigid body, to produce the outermost coating layer 38. The hot coating die 45 had a supply passage 50 comprising a clearance disposed immediately upstream of the point of confluence with the core layer 37, said supply passage 50 being internally provided with a main annular groove 53 which is semi-circular in section, four 10 mm-long branch manifolds 54 (grooves in vertical directions) connected to said main annular groove 53 and extending in vertical directions disposed at 10 mm-intervals on each of the face and reverse sides, and a connecting groove 55 (groove-shaped passage) having the same configuration as the branch manifolds 54 and connecting the forward ends of four branch manifolds 54.

When the molded article 36 of the thermoplastic composite material was molded by using the production apparatus according to this Example under the same molding conditions as above, the coating layer 38 was formed with a wood vein motif simulating a waterfall as illustrated in FIG. 22(*b*).

INDUSTRIAL APPLICABILITY

In accordance with the present invention constituted as above, there can be produced molded articles of the thermoplastic composite material which are not only free from the release of trace colored components occurring in the vegetable filler and from discoloration or fading even on prolonged outdoor exposure, thus being of high durability, but also are very satisfactory in appearance, such as wood-like texture, and in ease of recycling, and, hence, being used as less expensive and environment-friendly architectural members with high productivity and economically.

What is claimed is:

1. A method of producing a molded article of a thermoplastic composite material comprising extruding the thermoplastic composite material containing a thermoplastic resin and a vegetable filler, said vegetable filler content being 50 to 90 weight % of the total weight of said thermoplastic resin and said vegetable filler, wherein extrusion is carried out by means of an extrusion apparatus comprising at least an extruder, a hot shaping die, and a cooling die, said hot shaping die and cooling die being directly coupled, and wherein a coating layer composed of a resin material containing a thermoplastic resin is formed on the surface of a core layer obtainable by extrusion of the thermoplastic composite material.

2. A molded article of a thermoplastic composite material obtainable by the method of producing a molded article of a thermoplastic composite material according to claim 1.

3. The molded article of a thermoplastic composite material according to claim 2 wherein the resin material comprises at least two kinds of thermoplastic resins differing in melting point and being incompatible with each other.

4. The molded article of a thermoplastic composite material according to claim 3 wherein the thermoplastic resin contained in the thermoplastic composite material is a polyolefin resin.

5. The molded article of a thermoplastic composite material according to claim 2 wherein the thermoplastic resin contained in the thermoplastic composite material is a polyolefin resin.

6. The molded article of a thermoplastic composite material according to claim 2 wherein the coating layer is 0.1 to 0.5 mm in thickness.

7. The molded article of a thermoplastic composite material according to claim 2 which is a molded article having a profile.

8. The molded article of a thermoplastic composite material according to claim 2 wherein the thermoplastic resin contained in the thermoplastic composite material is identical to the thermoplastic resin contained in the resin material.

9. A molded article of a thermoplastic composite material obtainable by the method of producing a molded article of a thermoplastic composite material according to claim 1 wherein the resin material contains a cellulose powder.

10. The molded article of a thermoplastic composite material according to claim 9 wherein the cellulose powder content is 20 to 60 weight % of the resin material.

11. The molded article of a thermoplastic composite material according to claim 10 wherein the coating layer is 0.1 to 3 mm thickness.

12. The molded article of a thermoplastic composite material according to claim 9 wherein the coating layer is 0.1 to 3 mm in thickness.

13. The method of producing a molded article of a thermoplastic composite material according to claim 1 wherein the extrusion apparatus comprises the extruder, the hot shaping die, the cooling die, a surface heating die, and a hot coating die as serially arranged in this order, said hot shaping die and cooling die and said surface heating die and hot coating die being directly coupled respectively.

14. A method of producing a molded article of a thermoplastic composite material comprising extruding the thermoplastic composite material containing a thermoplastic resin and a vegetable filler, said vegetable filler content being 50 to 90 weight % of the total weight of said thermoplastic resin and said vegetable filler, wherein extrusion is carried out by means of an extrusion apparatus comprising at least an extruder, a hot shaping die, and a cooling die, said hot shaping die and cooling die being directly coupled, and wherein the extrusion apparatus comprises the extruder, the hot shaping die, the cooling die, a surface heating die, and a hot coating die as serially arranged in this order, said hot shaping die and cooling die and said surface heating die and hot coating die being directly coupled respectively.

15. The method of producing a molded article of a thermoplastic resin material according to claim 14 wherein the cooling die and surface heating die are directly coupled.

16. The method of producing a molded article of a thermoplastic composite material according to claim 14 wherein the hot coating die has a shaping passage for the resin material and a supply passage for supplying said resin material to said shaping passage, said supply passage and said shaping passage intersecting each other, and said supply passage being internally provided with a projection protruding in the thickness direction of the passage.

17. The method of producing a molded article of a thermoplastic composite material according to claim 16 wherein the supply passage is internally provided with a groove.

18. A method of producing a molded article of a thermoplastic resin material comprising extruding the thermoplastic composite material containing a thermoplastic resin and a vegetable filler, said vegetable filler content being 50 to 90 weight % of the total weight of said thermoplastic resin and said vegetable filler, wherein extrusion is carried out by means of an extrusion apparatus comprising at least an extruder, a hot shaping die, and a cooling die, said hot shaping die and cooling die being directly coupled, and wherein primary cooling at 150 to 180° C. is followed by secondary cooling at 60 to 140° C. in the cooling die.

19. The method of producing a molded article of a thermoplastic resin material comprising extruding the thermoplastic composite material containing a thermoplastic resin and a vegetable filler, said vegetable filler content being 50 to 90 weight % of the total weight of said thermoplastic resin and said vegetable filler.

wherein extrusion is carried out by means of an extrusion apparatus comprising at least an extruder, a hot shaping die, and a cooling die, said hot shaping die and cooling die being directly coupled, and wherein the extruder is a counterrotating twin-screw extruder and wherein the temperature of the thermoplastic composite material at the outlet of said counterrotating twin-screw extruder is controlled within the range of (melting point −15° C.) to (melting point +10° C.) of the thermoplastic resin contained in the thermoplastic composite material.

* * * * *

UNITED STATES PATENT AND TRADEMARK OFFICE
CERTIFICATE OF CORRECTION

PATENT NO. : 6,716,522 B2
DATED : April 6, 2004
INVENTOR(S) : Koji Matsumoto et al.

It is certified that error appears in the above-identified patent and that said Letters Patent is hereby corrected as shown below:

<u>Title page,</u>
Item [30], Foreign Application Priority Data, change "Nov. 14, 2000 (JP) ………….. 2000-346982" to -- Nov. 14, 2000 (JP) ………….. 2000-346902 --.

Signed and Sealed this

Twentieth Day of July, 2004

JON W. DUDAS
*Acting Director of the United States Patent and Trademark Office*